(12) United States Patent
Suzuki et al.

(10) Patent No.: US 6,991,770 B2
(45) Date of Patent: Jan. 31, 2006

(54) HYDROGEN STORAGE TANK

(75) Inventors: Takanori Suzuki, Wako (JP); Izuru Kanoya, Wako (JP); Mitsuya Hosoe, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 815 days.

(21) Appl. No.: 09/829,992

(22) Filed: Apr. 11, 2001

(65) Prior Publication Data
US 2002/0006365 A1  Jan. 17, 2002

(30) Foreign Application Priority Data

Apr. 11, 2000 (JP) .............................. 2000-115822
Apr. 11, 2000 (JP) .............................. 2000-115823

(51) Int. Cl.
*B01J 8/02* (2006.01)
*F17C 11/00* (2006.01)

(52) U.S. Cl. ............... 422/198; 422/188; 422/211; 422/218; 422/223; 422/239; 422/305; 422/222; 96/108; 96/121; 96/126; 96/146

(58) Field of Classification Search ........ 422/188–191, 422/198, 200, 211, 212, 305; 423/658.2; 429/19, 20; 96/126, 121, 143, 146; F17C 11/00
See application file for complete search history.

(56) References Cited

U.S. PATENT DOCUMENTS

| | | | |
|---|---|---|---|
| 4,108,605 A | * | 8/1978 | Billings ..................... 422/212 |
| 4,165,569 A | * | 8/1979 | Mackay ........................ 34/416 |
| 4,211,537 A | * | 7/1980 | Teitel ........................... 48/191 |
| 4,270,360 A | * | 6/1981 | Nakane et al. ............... 62/46.2 |
| 4,393,924 A | * | 7/1983 | Asami et al. .......... 165/104.12 |
| 4,457,136 A | * | 7/1984 | Nishizaki et al. ............ 62/46.2 |
| 4,723,595 A | * | 2/1988 | Yasunaga et al. ....... 165/104.12 |
| 5,441,716 A | * | 8/1995 | Rockenfeller ............... 423/299 |
| 6,099,811 A | * | 8/2000 | Stetson et al. .............. 422/212 |
| 6,318,453 B1 | * | 11/2001 | Ovshinsky et al. .... 165/104.12 |

FOREIGN PATENT DOCUMENTS

JP   61171998 A   *  8/1986
JP   11211267 A   *  8/1999

* cited by examiner

*Primary Examiner*—Hien Tran
*Assistant Examiner*—Jennifer A. Leung
(74) *Attorney, Agent, or Firm*—Arent Fox PLLC

(57) ABSTRACT

A hydrogen storage tank has an outer cylinder and a cylindrical hydrogen storage module within the outer cylinder spaced apart from an inner peripheral surface of the outer cylinder to provide a hydrogen passage therebetween. The cylindrical hydrogen storage module includes a lamination having a plurality of hydrogen storage units filled with powdery hydrogen absorption material and a hydrogen absorption and desorption surface on an entire outer peripheral surface, while interposing a heating/cooling element between ones of adjacent units. First and second main passages penetrate the lamination in a lamination direction of the units, and permit heating fluid and cooling fluid to flow therethrough. Sub passages branch from the main passages and extend over within each of the heating/cooling elements.

6 Claims, 21 Drawing Sheets

US 6,991,770 B2

HYDROGEN STORAGE TANK

BACKGROUND OF THE INVENTION

1. Field of the Invention

The present invention relates to a hydrogen storage tank for absorbing and desorbing hydrogen.

2. Description of the Prior Art

An example of a conventionally known hydrogen storage tank that absorbs and desorbs hydrogen is a double cylinder tank. The double cylinder tank has an inner cylinder which accommodates a hydrogen storage alloy and is provided, around its longitudinal axis, with a hydrogen passage for passing hydrogen to be absorbed and to be desorbed therethrough as well as to provide a passage for heating fluid and cooling fluid between the inner and outer cylinders.

The conventional double cylinder tank, however, has a problem in that its narrow hydrogen passage results in a small area for hydrogen absorption and desorption per unit volume, thereby causing small amounts of hydrogen absorption per unit volume and a slow rate of hydrogen desorption because of heating inefficiency.

SUMMARY OF THE INVENTION

An object of the present invention is to provide a hydrogen storage tank that increases the amount of hydrogen absorption per unit volume by enlarging an area for hydrogen absorption and desorption per unit volume and performs rapid hydrogen desorption.

In order to attain the above described object, according to the present invention, there is provided a hydrogen storage tank comprising: an outer cylinder; and at least one cylindrical hydrogen storage module accommodated in the outer cylinder in such a manner as to be spaced apart from an inner peripheral surface of the outer cylinder to provide a hydrogen passage. The cylindrical hydrogen storage module comprises: a lamination of a plurality of hydrogen storage units filled with hydrogen absorption material and having a hydrogen absorption and desorption surface on at least a part of an outer peripheral surface, while interposing a heating/cooling element between adjacent units; at least one main passage which penetrates the lamination in a unit lamination direction and which permits heating fluid and cooling fluid to flow therethrough; and a sub passage branching from the main passage and extending over within each of the heating/cooling elements.

In the above configuration, the hydrogen absorption and desorption surface is on the outer peripheral surface of the hydrogen storage unit and is surrounded by the hydrogen passage, which permits enlarging an area for hydrogen absorption and desorption per unit volume and thereby increases the amount of hydrogen absorption per unit volume. This further permits efficient cooling of each hydrogen storage unit by each heating/cooling element having a large area for heat transfer, thereby preventing thermal storage in the hydrogen absorption materials, improving hydrogen absorption efficiency and increasing the amount of hydrogen absorption.

On the other hand, during hydrogen desorption, the hydrogen absorption materials in each hydrogen storage unit are efficiently heated by each heating/cooling element, which permits rapid hydrogen desorption from the large hydrogen absorption and desorption surface.

Moreover, increasing and decreasing the number of the hydrogen storage units easily permits increasing and decreasing the amount of hydrogen absorption of the tank, and also achieves satisfactory productivity of the tank and simplification in its configuration.

According to the present invention, there is provided a hydrogen storage tank comprising: an outer cylinder; and a cylindrical hydrogen storage section accommodated in the outer cylinder in such a manner as to be spaced apart from an inner peripheral surface of the outer cylinder to provide a hydrogen passage, and having a hydrogen absorption and desorption surface on at least a part of an outer peripheral surface. The cylindrical hydrogen storage section comprises: a hydrogen absorption material aggregate; and a fluid passage provided in the aggregate for passing heating fluid and cooling fluid therethrough.

In the above configuration, the hydrogen absorption and desorption surface is on the outer peripheral surface of the hydrogen storage section and is surrounded by the hydrogen passage, which permits enlarging an area for hydrogen absorption and desorption per unit volume and thereby increases the amount of hydrogen absorption per unit volume.

Further, there is provided a fluid passage for passing cooling fluid through the hydrogen absorption material aggregate. During hydrogen absorption, since the hydrogen adsorption proceeds from the outer peripheral side, that is, inwardly from the hydrogen absorption and desorption surface, heat generated as a result of the hydrogen absorption is smoothly transferred to the cooling fluid through the hydrogen absorption materials that have not absorbed any hydrogen. Thus, thermal storage in the hydrogen absorption material aggregate is prevented, hydrogen absorption efficiency is improved, and the amount of hydrogen absorption is increased.

Moreover, in hydrogen desorption, the hydrogen absorption material aggregate is efficiently heated from inside, which permits a rapid hydrogen desorption from the large hydrogen absorption and desorption surface. In addition, the hydrogen storage tank can be simplified in its configuration.

The above-mentioned and other objects, features and advantages of this invention will become more apparent by the following detailed description of the embodiments of the invention in reference to the accompanying drawings.

DETAILED DESCRIPTION OF THE PREFERRED EMBODIMENTS

Figure 1:
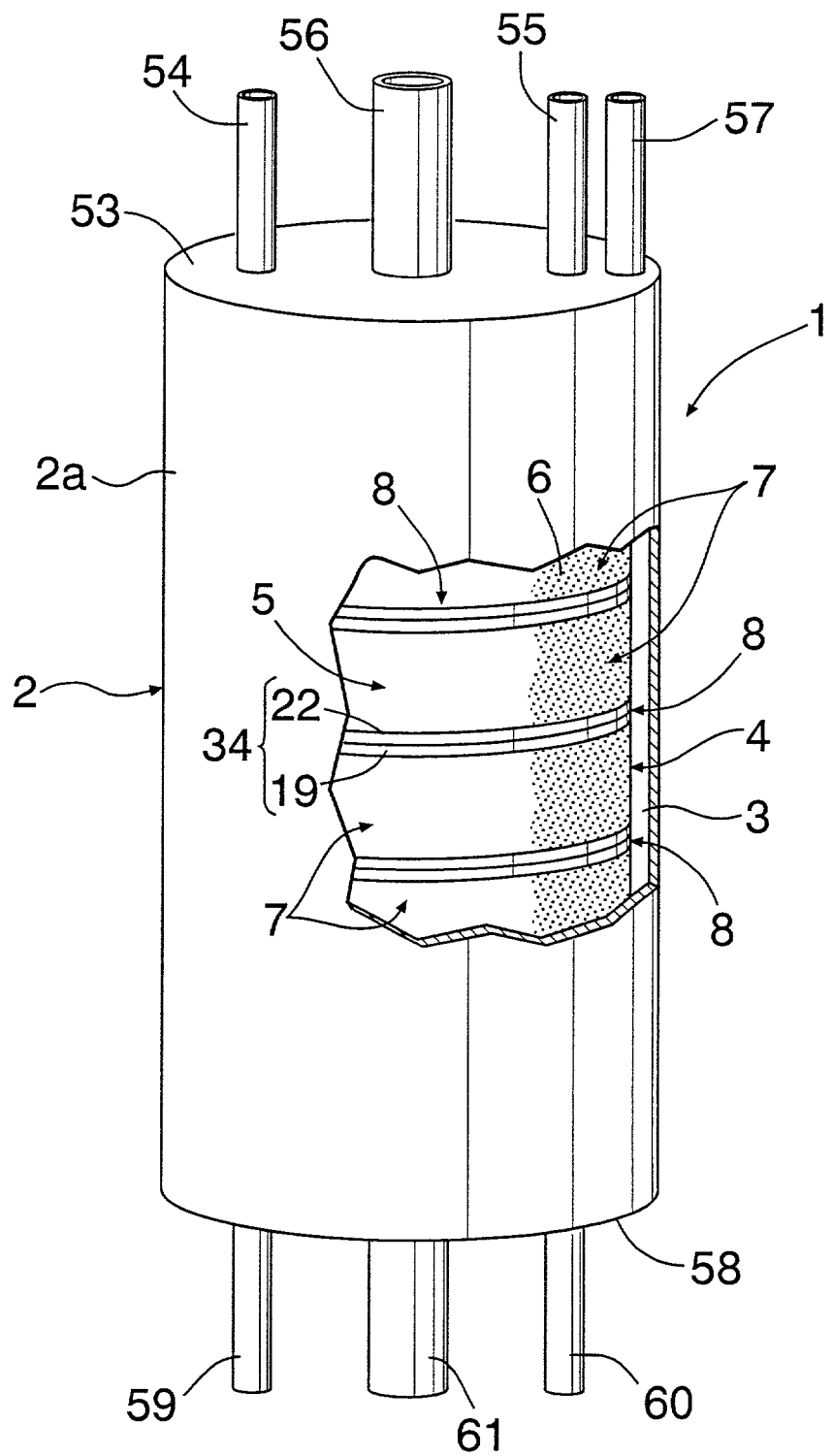
FIG. 1 is a perspective, partially exposed view of a hydrogen storage tank according to a first embodiment of the present invention.

FIGS. 1 to 6A show a hydrogen storage tank 1 according to a first embodiment of the present invention. The hydrogen storage tank 1 includes a pressure-resist outer cylinder 2 made of stainless steel and having a circular cross section. At least one (one in this embodiment) cylindrical hydrogen storage module 4 is accommodated within the outer cylinder 2 in such a manner as to be spaced apart from an inner peripheral surface of an outer peripheral wall 2a of the outer cylinder 2 to provide a hydrogen passage 3 therebetween.

The cylindrical hydrogen storage module 4 comprises a lamination 5 of a plurality of hydrogen storage units 7, each filled with powdery hydrogen absorption materials (HSM) and having a hydrogen absorption and desorption surface 6 on at least a part of its outer peripheral surface (a whole outer peripheral surface in this embodiment), while interposing a heating/cooling element 8 between adjacent units 7. Hydrogen storage alloy (for example, a Mg alloy such as $Mg_2Ni$) or carbon with a nanostructure is used as the hydrogen absorption material (HSM). The heating/cooling element 8 is provided on a top surface of the uppermost hydrogen storage unit 7 and on a bottom surface of the lowest hydrogen storage unit 7, respectively, as required.

The hydrogen storage module 4 has at least one main passage which penetrates the lamination 5 in a unit lamination direction and permits heating fluid and cooling fluid to flow therethrough. In this embodiment, the module 4 has first and second main passages 9 and 10. First and second sub passages 11 and 12 branch from the main passages 9 and 10 and extend over within each of the heating/cooling elements 8.

The hydrogen storage unit 7 is provided with a stainless steel cylinder 14 having a through hole 13 with a large diameter around its axis. The cylinder 14 is filled with the powdery hydrogen absorption material (HSM) and includes a hollow shaft 15 having the through hole 13, top and bottom walls 16 and 17 formed integrally with each end of the hollow shaft 15, and a porous filter 18 joined by welding or the like between opposite outer peripheries of the top and bottom walls 16 and 17 to form an outer peripheral wall. The filter 18 has a number of pores having a diameter of, for example, 0.1 to 10 $\mu$m, through which hydrogen passes so that the whole outer peripheral surface constituates the hydrogen absorption and desorption surface 6.

Figure 3:
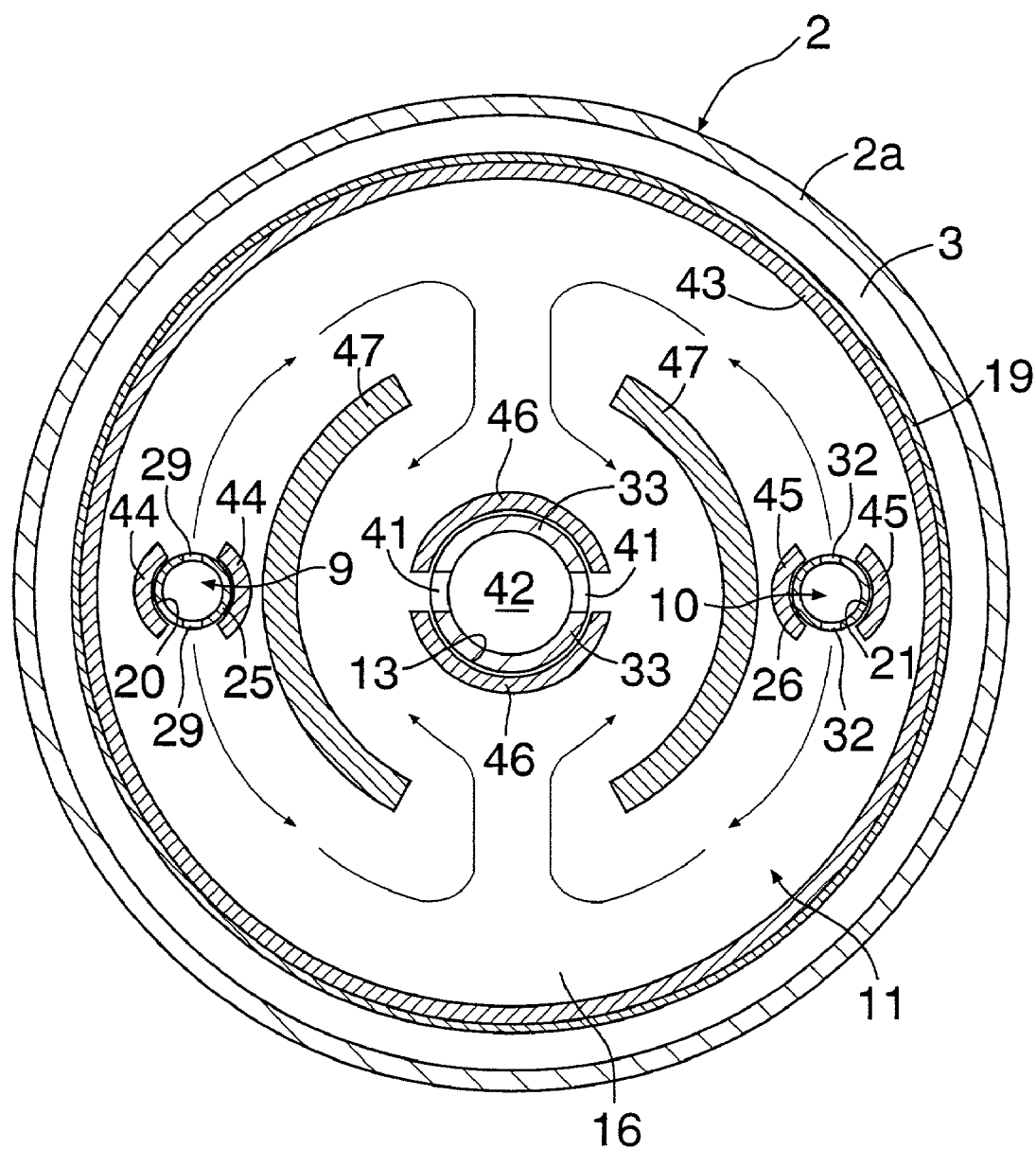
FIG. 3 is a cross-sectional view taken along section line 3—3 of FIG. 2.
Figure 4:
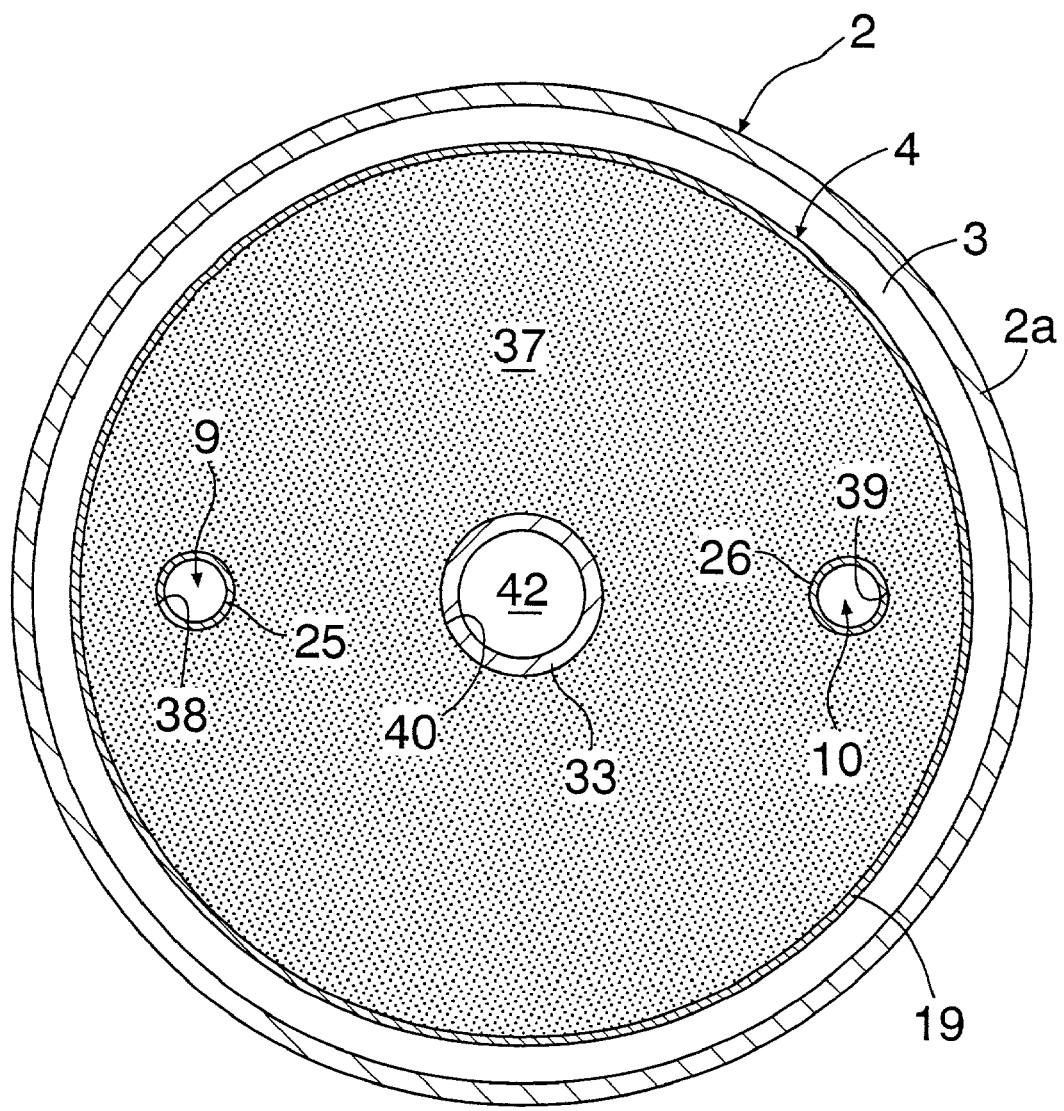
FIG. 4 is a cross-sectional view taken along section line 4—4 of FIG. 2.

As shown in FIG. 3, the top wall 16 has an annular projection 19 at its outer peripheral edge that extends upward. A pair of through holes 20 and 21 with small diameters are located near the projection 19 in alignment with the through hole 13. The bottom wall 17 has an annular projection 22 at its outer peripheral edge that extends downward. A pair of through holes 23, 24 with small diameters are located near the projection 22 and are coaxial with the through holes 20 and 21 respectively of the top wall 16.

A first stainless steel pipe 25 for the first main passage 9 is inserted through one set of the through holes 20 and 23 coaxially situated with the top and bottom walls 16 and 17. A second stainless steel pipe 26 for the second main passage 10 is inserted through the other set of the through holes 21 and 24 coaxially situated with the top and bottom walls as well. The first and second pipes 25 and 26 are joined in the holes 20, 23 and 21, 24, respectively, by welding or the like.

A bottom end of the first pipe 25 joins with a lower surface of the bottom wall 17 and has a frustoconically shaped opening 27 with its larger diameter portion directed toward the bottom of the tank 2. An upper end of the first pipe 25 projects out of the top wall 16 such that its top end 28 is positioned above the top surface of the annular projection 19, and is frustoconically shaped with its larger diameter portion also directed toward the bottom of the tank 2 so as to fit in the lower opening 27. In addition, the first pipe 25 is formed at its upper end with four inflow ports 29. Two upper inflow ports 29, which oppose each other, are positioned slightly below the large diameter portion of the frustoconically shaped top end 28, but above the top surface of the annular projection 19. Two lower inflow ports 29, which oppose each other, are positioned slightly above the upper surface of the top wall 16, but below the top surface of the annular projection 19.

A bottom end of the second pipe 26 joins with a lower surface of the bottom wall 17 and has a frustoconically shaped lower opening 30 with its larger diameter portion directed toward the bottom of the tank 2. An upper end of the second pipe 26 projects out of the top wall 16 such that its top end 31 is positioned above the top surface of the annular projection 19, and is frustoconically shaped with its larger diameter end portion also directed toward the bottom of the tank 2 so as to fit in the lower opening 30. In addition, the second pipe 26 is formed at its upper end with four inflow ports 32. Two upper inflow ports 32, which oppose each other, are positioned slightly below the larger diameter portion of the frustoconically shaped top end 31, but above the top frustoconically shaped surface of the annular projection 19. Two lower inflow ports 32, which oppose each other, are positioned slightly above the upper surface of the top wall 16, but below the top surface of the annular projection 19.

In the lamination 5, the adjacent hydrogen storage units 7, specifically the brim surface of the annular projection 19 at the top wall 16 of the lower unit 7 and the brim surface of the annular projection 22 at the bottom wall 17 of the upper unit 7, are mated together and joined, such as, for example, by welding or the like. The frustoconically top end 28 of the first pipe 25 at the lower storage unit 7 is fit into the frustoconically lower opening 27 of the neighboring upper storage unit 7. These steps are repeated using a plurality of first pipes 25 to form the first main passage 9 therein. Then, the frustoconically shaped top end 31 of the second pipe 26 at the lower storage unit 7 is fit into the frustoconically shaped lower opening 30 of the neighboring upper storage unit 7. These steps are repeated using a plurality of second pipes 26 to form the second main passage 10 therein. The large diameter stainless steel pipe 33 is fit through a series of through holes 13 with correspondingly large diameters of each hydrogen storage unit 7.

Between the adjacent hydrogen storage units 7, a housing 36 of the heating/cooling element 8 is formed which shares the top and bottom walls 16 and 17 as its bottom and top walls. The housing 36 has an outer peripheral wall 34 formed by the joined annular projections 19 and 22 and an inner peripheral wall 35 which is a part of the large diameter stainless steel pipe 33. A disc shaped porous carrier 37 that holds a catalyst is placed in a vertically intermediate portion of an annular space of the housing 36. The porous carrier 37 is made of metal (for example, Ni), porous materials, ceramic porous materials, and the like having continuous pores. The porous carrier 37 also has two through holes 38 and 39 with small diameters and a through hole 40 with a large diameter fitted to the first and second pipes 25 and 26 and the pipe 33 with a large diameter, respectively. The outer peripheral surface of the porous carrier 37 is tightly fitted to the inner peripheral surface of the outer peripheral wall 34. The porous carrier 37 thus divides the inside of the housing 36 into upper and lower spaces. The respective lower inflow ports 29 and 32 of the first and second pipes 25 and 26 communicate with the lower space, which functions as the first sub passage 11 branching from the first and second main passages 9 and 10. The upper inflow ports 29 and 32 of the first and second pipes 25 and 26 communicate with the upper space, which functions as the second sub passage 12 branching from the first and second main passages 9 and 10. The first and second sub passages 11 and 12 communicate with a discharge passage 42 in the large diameter pipe 33 via two outflow ports 41 respectively formed on upper and lower portions of the inner peripheral wall 35.

Figure 2:
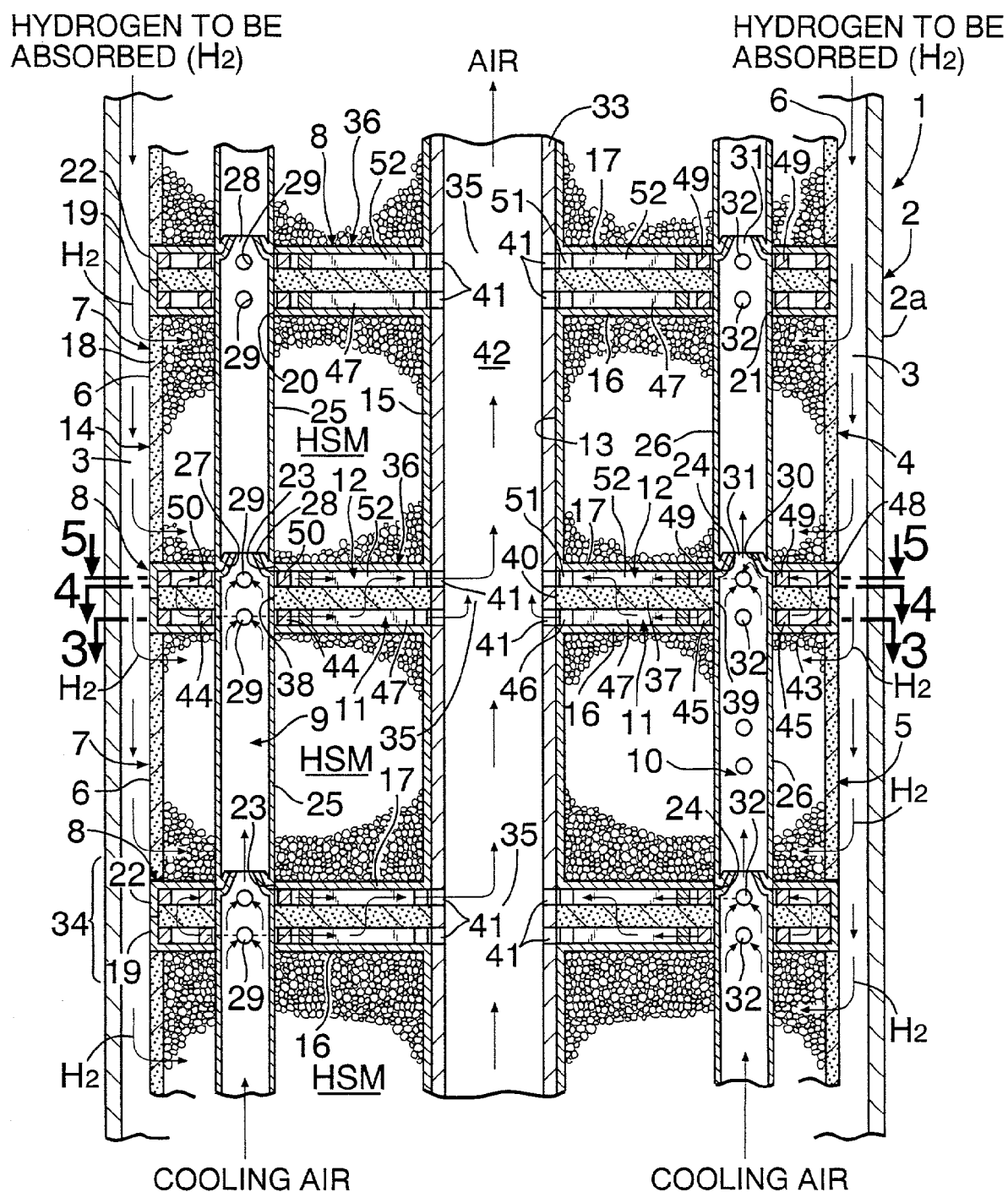
FIG. 2 is a vertical sectional view of the hydrogen storage tank according to the first embodiment of the present invention.

As shown in FIGS. 2 and 3, in order to maintain the first sub passage 11, a plurality of spacers made of stainless steel, metal such as Ni, ceramics, or the like are arranged between the porous carrier 37 and the top wall 16. Particularly, an annular spacer 43 is arranged at an outer periphery of the top wall 16, a pair of circular arc spacers 44 are arranged around the first pipe 25 so as not to close openings of both inflow ports 29, a pair of circular arc spacers 45 are arranged around the second pipe 26 so as not to close openings of both inflow ports 32, a pair of circular arc spacers 46 are arranged around the large diameter pipe 33 so as not to close openings of both outflow ports 41, and a pair of circular arc spacers 47 are respectively arranged between the large diameter pipe 33 and the first/second pipes 25/26 so as to sandwich the pipe 33 in such a manner that the concave surfaces of the spacers 47 are directed to the pipe 33 and the circumferentially central portions of their convex surfaces are situated near the first and second pipes 25 and 26.

The spacers 43 to 47 also function as guide members for circulating, throughout the first sub passage 11, the heating fluid and cooling fluid flowing from the respective inflow ports 29 and 32 into the first sub passage 11. As shown by the arrows in FIG. 3, the heating fluid or the like from the respective inflow ports 29 and 32 is guided to the space between the annular spacer 43 and the circular arc spacer 47. Then, the heating fluid from one inflow port 29 collides with the heating fluid from the other inflow port 32. The heating fluid is then introduced to the space between the circular arc spacers 46 and 47 being guided along one of the opposite ends of both circular arc spacers 47.

Figure 5:
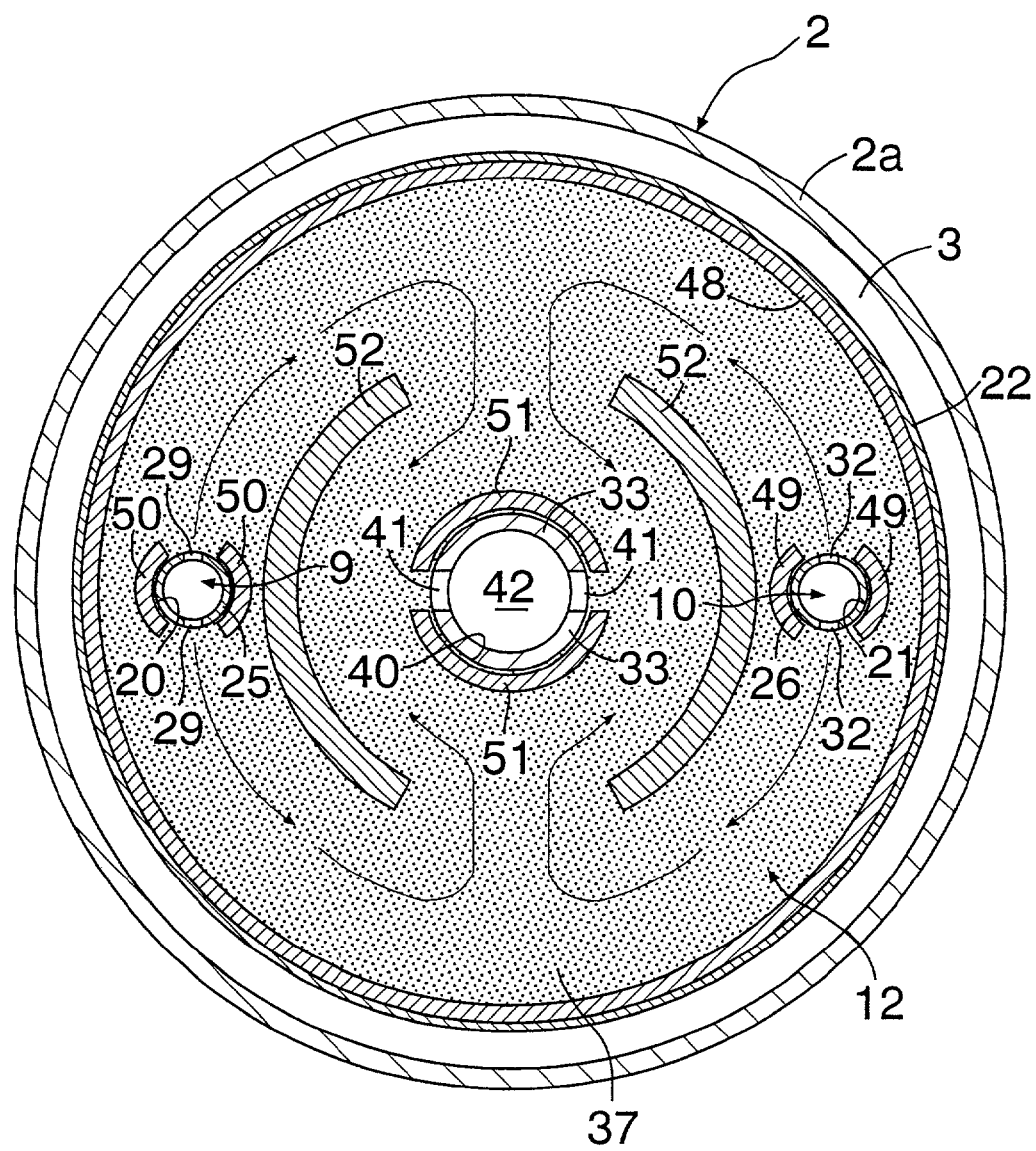
FIG. 5 is a cross-sectional view taken along section line 5—5 of FIG. 2.

As shown in FIGS. 2 and 5, in order to maintain the second sub passage 12, a plurality of spacers made of the same materials mentioned above are arranged between the porous carrier 37 and the bottom wall 17. Specifically, an annular spacer 48 is arranged at an outer periphery of the porous carrier 37, a pair of circular arc spacers 50 are arranged around the first pipe 25 so as not to close openings of both inflow ports 29, a pair of circular arc spacers 49 are arranged around the second pipe 26 so as not to close openings of both inflow ports 32, a pair of circular arc spacers 51 are arranged around the pipe 33 so as not to close both outflow ports 41, and a pair of circular arc spacers 52 are arranged respectively between the pipe 33 and the first/second pipes 25/26 so as to sandwich the pipe 33 in such a manner that the concave surfaces of the spacers 52 are directed to the pipe 33, and the circumferentially central portions of their convex surfaces are situated near the first and second pipes 25 and 26.

The spacers 48 to 52 also function as guide members for circulating, throughout the second sub passage 12, the heating fluid and cooling fluid flowing from the respective inflow ports 29 and 32 into the second sub passage 12. As shown by the arrows in FIG. 5, the heating fluid or the like from the respective inflow ports 29 and 32 is guided to the space between the annular spacer 48 and the circular arc spacer 52. Then, the heating fluid from one inflow port 29 collides with the heating fluid from the other inflow port 32. The heating fluid is then introduced to the space between the circular arc spacers 51 and 52 being guided along one of the opposite ends of both circular arc spacers 52.

The heating fluid is a mixed gas of hydrogen and oxygen, which flows through the first and second main passages 9 and 10. The porous carrier 37 of the heating/cooling element 8 carries therein and on its surface platinum, palladium and the like as a catalyst for facilitating the burning reaction between the hydrogen for burning and the oxygen.

Cooling gas, for example air, is used as the cooling fluid. The cooling fluid passes through the first and second main passages 9 and 10, the first and second sub passages 11 and 12, and the discharge passage 42.

As shown in FIG. 1, provided on the top wall 53 of the outer cylinder 2 are first to fourth connecting pipes 54 to 57 which communicate with the first and second pipes 25 and 26, the top of the large diameter pipe 33, and the upper portion of the hydrogen passage 3. Provided on the bottom wall 58 of the outer cylinder 2 are fifth to seventh connecting pipes 59 to 61 which communicate with the first and second pipes 25 and 26, and the bottom of the pipe 33.

Next, hydrogen absorption and desorption in the hydrogen storage tank 1 will be described.

During hydrogen absorption, as shown in FIG. 2, the hydrogen is introduced from the fourth connecting pipe 57 to the hydrogen passage 3. The hydrogen passes through the filter 18 around the entire periphery of each hydrogen storage unit 7 to be absorbed by the powdery hydrogen absorption material HSM.

Cooling air is supplied from the bottom of the first and second main passages 9 and 10 via the fifth and sixth connecting pipes 59 and 60 to pass through the main passages 9 and 10. At that time, the cooling air is narrowed by the top ends 28 and 31 of the frustoconically shaped first and second pipes 25 and 26 so that air pools are formed near the top ends 28 and 31. The cooling air from the air pools pass through the first and second sub passages 11 and 12 and the porous carrier 37 via the respective inflow ports 29 and 32, and then flows from the respective outflow ports 41 into the discharge passage 42 and passes therethrough.

As a result, the entire outer peripheral surface of the filter 18 is the hydrogen absorption and desorption surface 6, which permits enlarging the surface area for hydrogen absorption and desorption per unit volume, thereby increasing the amount of hydrogen absorption per unit volume and the rate of hydrogen absorption.

The powdery hydrogen absorption material HSM of each hydrogen storage unit 7 is efficiently cooled by the first and second main passages 9 and 10, the discharge passage 42, and the heating/cooling element 8 having a large area for heat transfer, thereby preventing thermal storage in the powdery hydrogen absorption materials HSM.

Figure 6A:
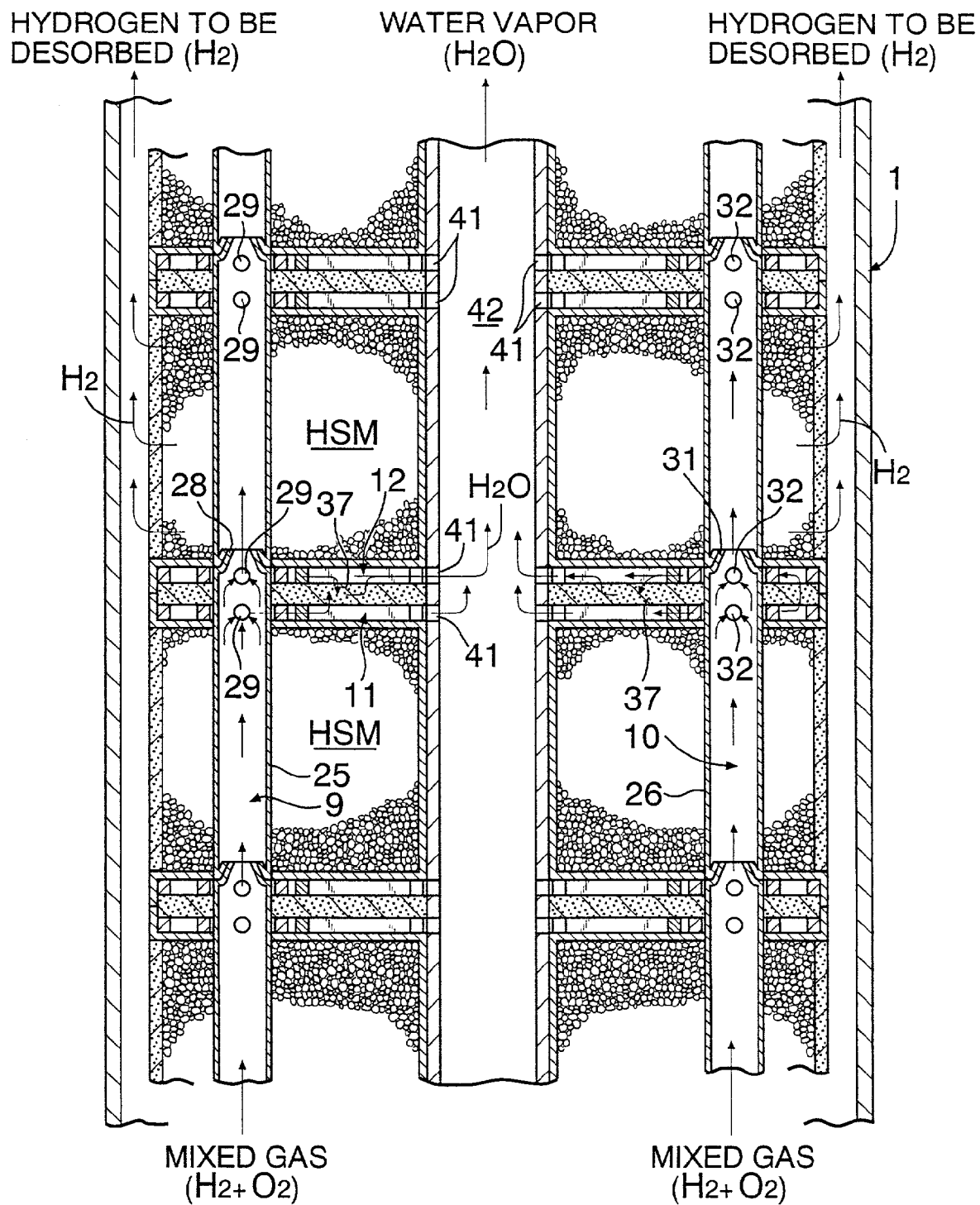
FIG. 6A is a vertical cross-sectional view illustrating the flow of a mixed gas of hydrogen and oxygen, water vapor, and hydrogen to be desorbed.

During hydrogen desorption, as shown in FIG. 6A, the mixed gas is supplied from the bottom side of the first main passage 9 via the fifth connecting pipe 59 to pass through the main passage 9. The mixed gas is also supplied from the bottom side of the second main passage 10 via the sixth connecting pipe 60 to pass through the second main passage 10. The flow of the mixed gas is narrowed by the top end 28 of the frustoconically shaped first pipe 25 so that a mixed gas pool forms near the top end 28. The mixed gas from the mixed gas pool passes through the first and second sub passages 11 and 12 and the porous carrier 37 via the respective inflow ports 29. Also, the mixed gas is narrowed by the top end 31 of the frustoconically shaped second pipe 26 so that a mixed gas pool forms near the top end 31. Then, the mixed gas from the mixed gas pool passes the first and second sub passages 11 and 12 and the porous carrier 37 via the respective inflow ports 32.

Thus, due to the presence of the platinum catalyst in the first and second sub passages 11 and 12 and the porous carrier 37, the mixed gas is burned to generate burning heat and heated water vapor. The heated water vapor passes from the housing 36 through the discharge passage 42 via the respective outflow ports 41.

Burning heat is transferred to the powdery hydrogen absorption material HSM via the heating/cooling element 8 having a large area for heat transfer, while the heat from the heated water vapor is transferred to the powdery hydrogen absorption material HSM via the pipe 33. Then, the hydrogen absorption material HSM is efficiently heated, which permits rapid hydrogen desorption from the wide hydrogen absorption and desorption surface 6.

As described above, the hydrogen passage 3 is provided between the outer cylinder 2 and the cylindrical hydrogen storage module 4 without direct contact therebetween, so that the insulation efficiency can be increased between the outer cylinder 2 and the cylindrical hydrogen storage module 4 during hydrogen absorption and desorption. The first and second main passages 9 and 10 are formed by mutually joining the first pipes 25 and the second pipes 26, respectively, at the same time as lamination of the adjacent hydrogen storage units 7, so that the main passages 9 and 10 can be easily formed. Because an amount of expansion accompanying hydrogen absorption is substantially uniform in each hydrogen storage unit 7 and the outer cylinder 2 is spaced from each hydrogen storage unit 7, no defects occur, such as deformation of the outer cylinder 2, during expansion of the hydrogen storage unit 7. The carrier 37 may not be porous.

Figure 6B:
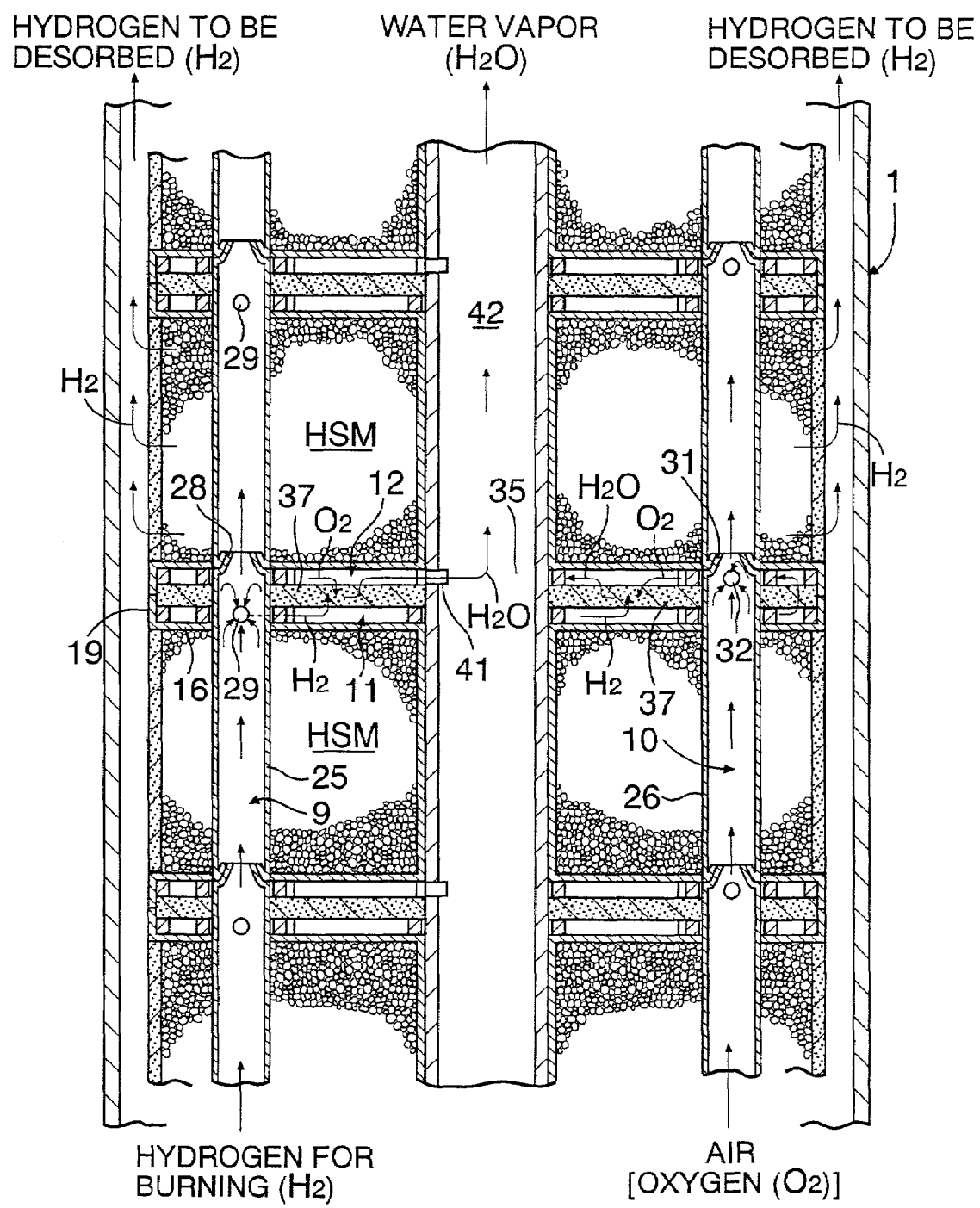
FIG. 6B is a vertical cross-sectional view of a modification of the first embodiment illustrating the flow of hydrogen for burning, oxygen, water vapor, and hydrogen to be desorbed.

FIG. 6B shows a modification of the first embodiment. In this case, hydrogen for burning and oxygen are used as heating fluid. The first main passage 9 permits the hydrogen for burning to flow therethrough, and the second main passage 10 permits the oxygen (air in this embodiment) to flow therethrough. In the upper end of the first pipe 25, two inflow ports 29 opposing each other are formed to be positioned slightly above the upper surface of the top wall 16, but below the top surface of the annular projection 19. In the upper end of the second pipe 26, two inflow ports 32 opposing each other are formed to be positioned slightly below the larger diameter portion of the frustoconically shaped top end 31, but above the top surface of the annular projection 19. The second sub passage 12 communicates with a discharge passage 42 in the large diameter pipe 33 via outflow ports 41 formed on the inner peripheral wall 35 that forms part of the large diameter pipe 33. During hydrogen desorption, the hydrogen for burning is supplied from the bottom side of the first main passage 9 via the fifth connecting pipe 59 to pass through the main passage 9, and the air containing oxygen is supplied from the bottom side of the second main passage 10 via the sixth connecting pipe 60 to pass through the second main passage 10. The flow of hydrogen for burning is narrowed by the top end 28 of the frustoconically shaped first pipe 25 so that a hydrogen pool forms near the top end 28. The hydrogen for burning from the hydrogen pool passes through the first sub passage 11 via the respective inflow ports 29. Also, the air is narrowed by the top end 31 of the frustoconically shaped second pipe 26 so that the air pool forms near the top end 31. Then, the air from the air pool passes the second sub passage 12 via the respective inflow ports 32. Thus, due to the presence of the platinum catalyst and the like in the first and second sub passages 11 and 12 and the porous carrier 37, the hydrogen for burning and oxygen are burned to generate burning heat and heated water vapor. The heated water vapor passes through the discharge passage 42 via the outflow ports 41.

Figure 7:
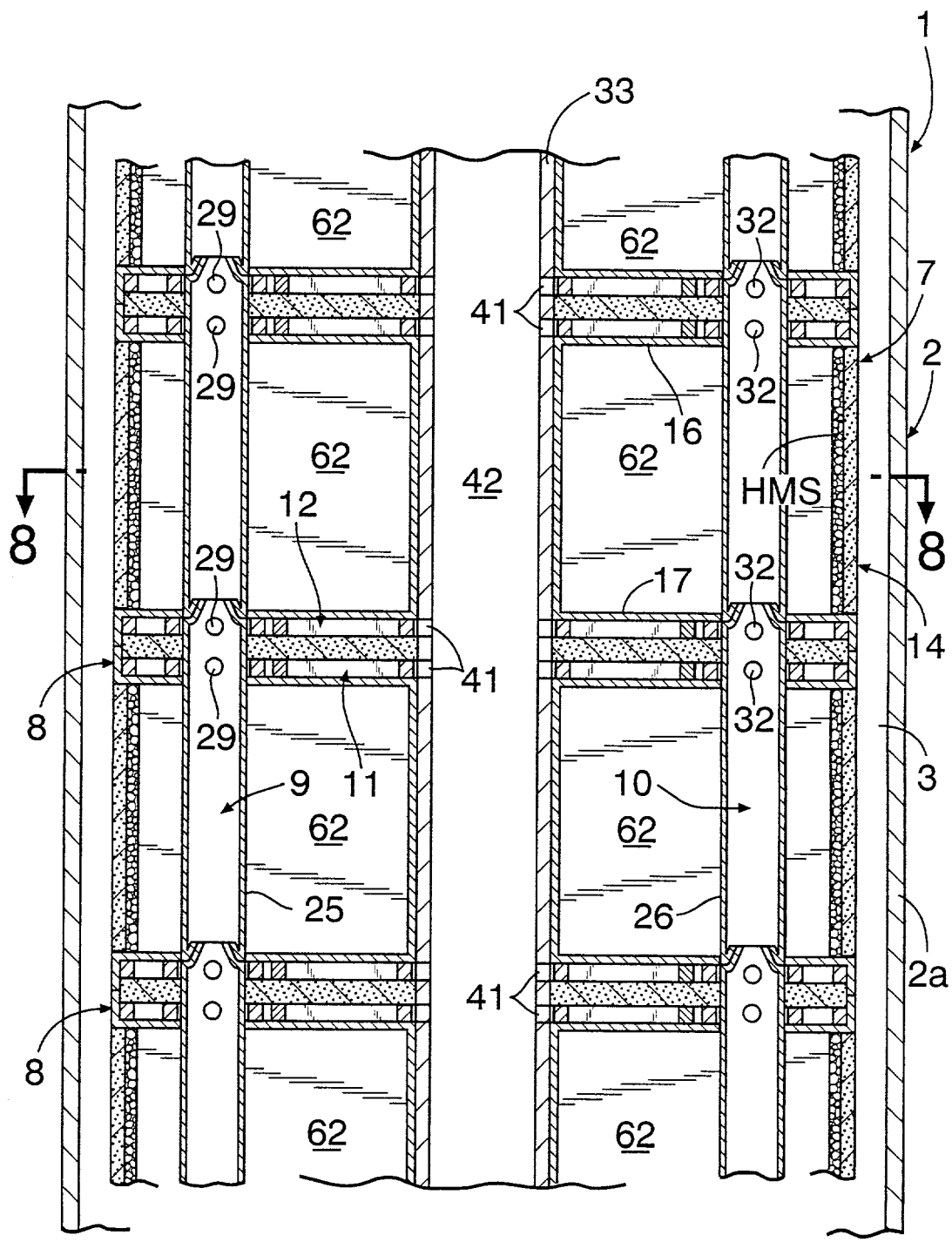
FIG. 7 is a vertical cross-sectional view of a hydrogen storage tank according to a second embodiment of the present invention.
Figure 8:
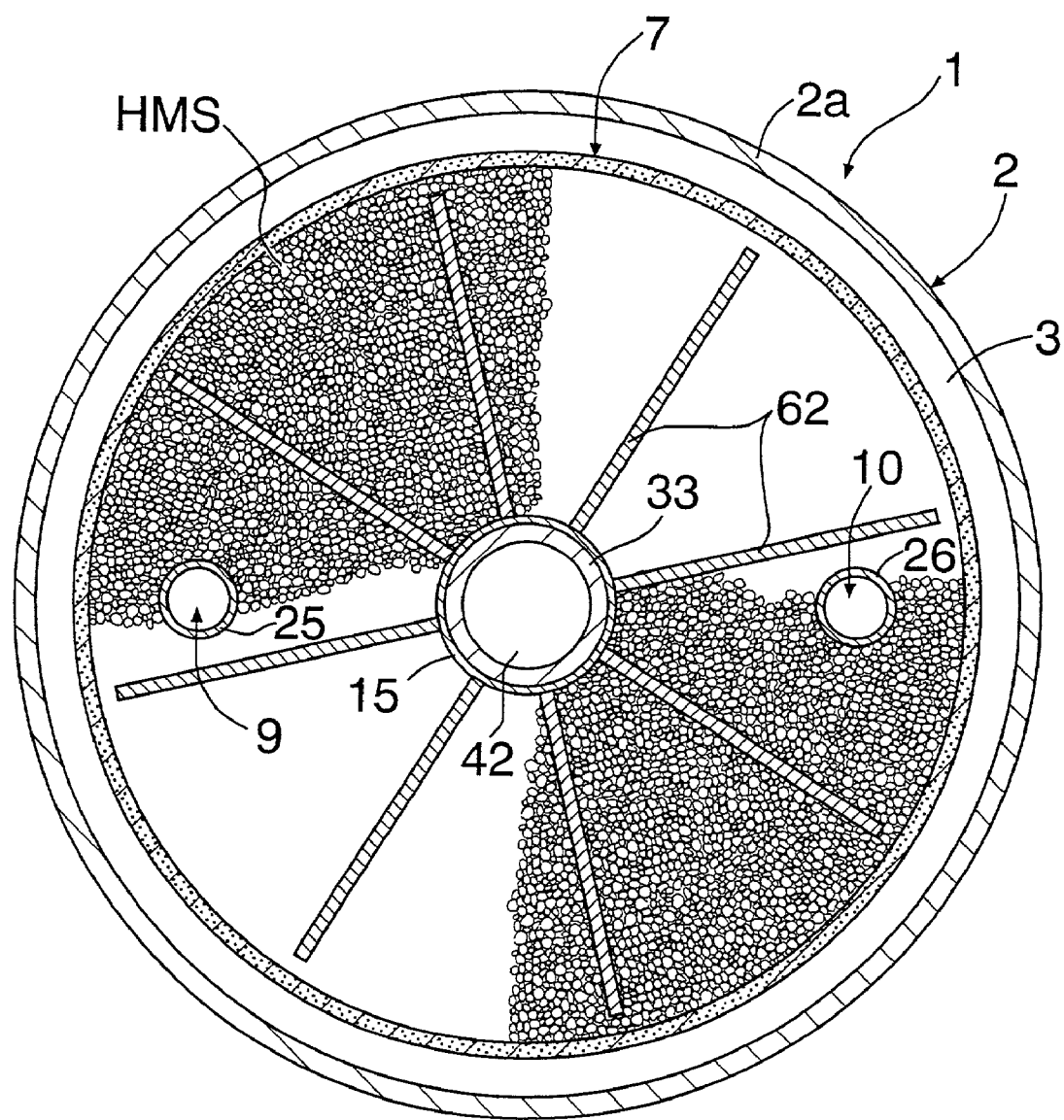
FIG. 8 is a cross-sectional view taken along section line 8—8 in FIG. 7.

FIGS. 7 and 8 show a hydrogen storage tank 1 according to a second embodiment of the present invention. In each hydrogen storage unit 7 of this embodiment, a plurality of fins 62, made of materials with excellent thermal conductivity, such as copper and Ni, are arranged in the cylinder 14 so as to radially extend from a hollow shaft 15. Each fin 62 is joined to the hollow shaft 15 and the top and bottom walls 16 and 17 by welding. Also, each fin 62 contacts the heating and cooling element 8.

The fins 62 are embedded in powdery hydrogen absorption material HSM to contribute to the cooling and heating of the hydrogen absorption material HSM, strengthen the cylinder 14, and prevent uneven distribution of the powdery hydrogen absorption material HSM. In this case, the inflow ports 29, 32, and the outflow ports 41 may be positioned in the same manner as in the embodiment shown in FIG. 6B, and hydrogen for burning and oxygen (air) may be used as heating fluid.

Figure 9:
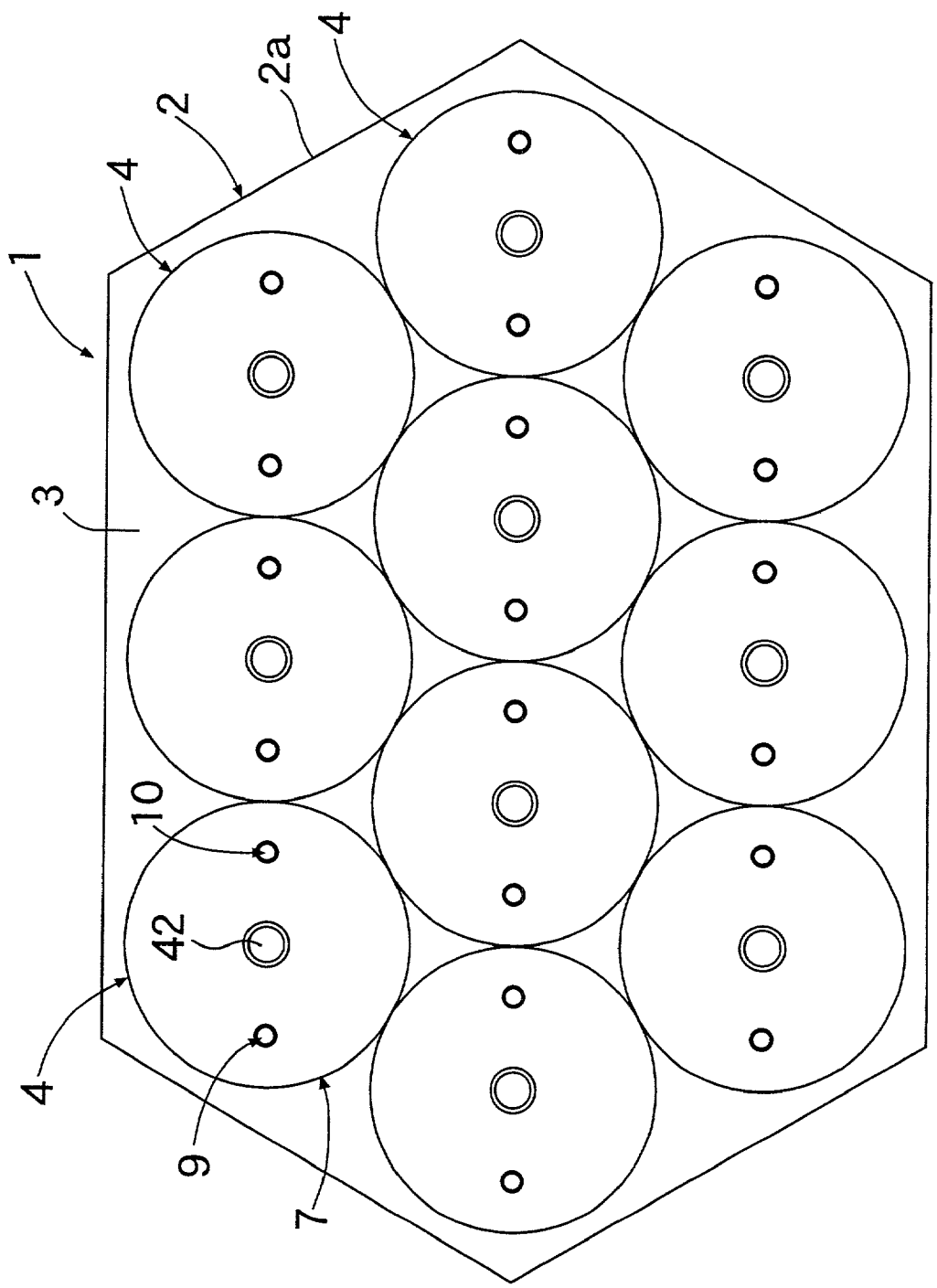
FIG. 9 is a schematic diagram of a hydrogen storage tank according to a third embodiment of the present invention.

FIG. 9 shows a hydrogen storage tank 1 according to a third embodiment of the present invention. In this embodiment, a plurality of hydrogen storage modules 4 are arranged in the pressure-resist outer cylinder 2 to have a close packed structure in order to increase the amount of hydrogen absorption.

Figure 10:
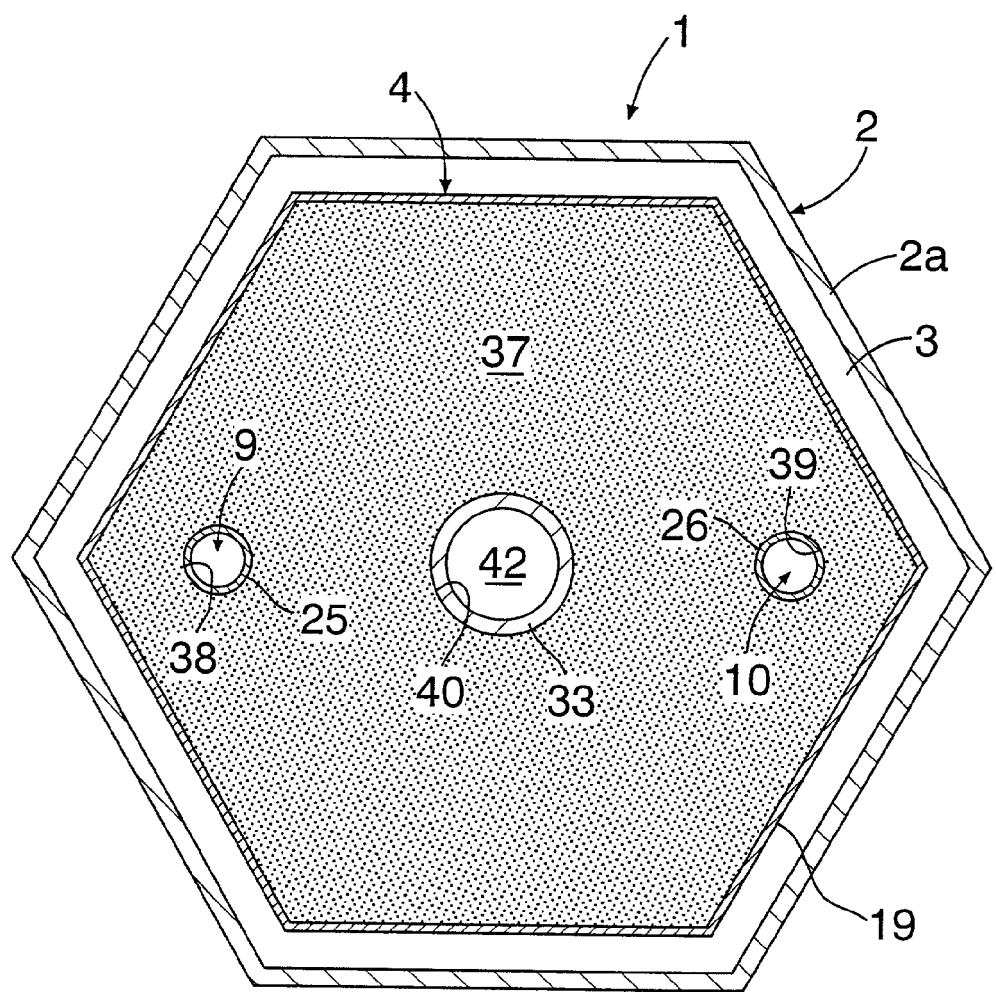
FIG. 10 is a cross sectional view of a hydrogen storage tank according to a fourth embodiment of the present invention.

FIG. 10 shows a hydrogen storage tank 1 according to a fourth embodiment of the present invention. In this embodiment, the outer cylinder 2 and the cylindrical hydrogen storage module 4 are formed to have hexagonal horizontal cross sections. In this manner, the horizontal cross sections of the outer cylinder 2 and the cylindrical hydrogen storage module 4 have a large freedom and can be shaped with no special restraint.

In the third and fourth embodiments, the inflow ports 29, 32, and the outflow ports 41 may be positioned in the same manner as in the embodiment shown in FIG. 6B, and it is also possible to pass hydrogen and oxygen (air) as the heating fluid through the first and second main passages 9 and 10. It is also possible to provide only one main passage through which the mixed gas passes.

Figure 11:
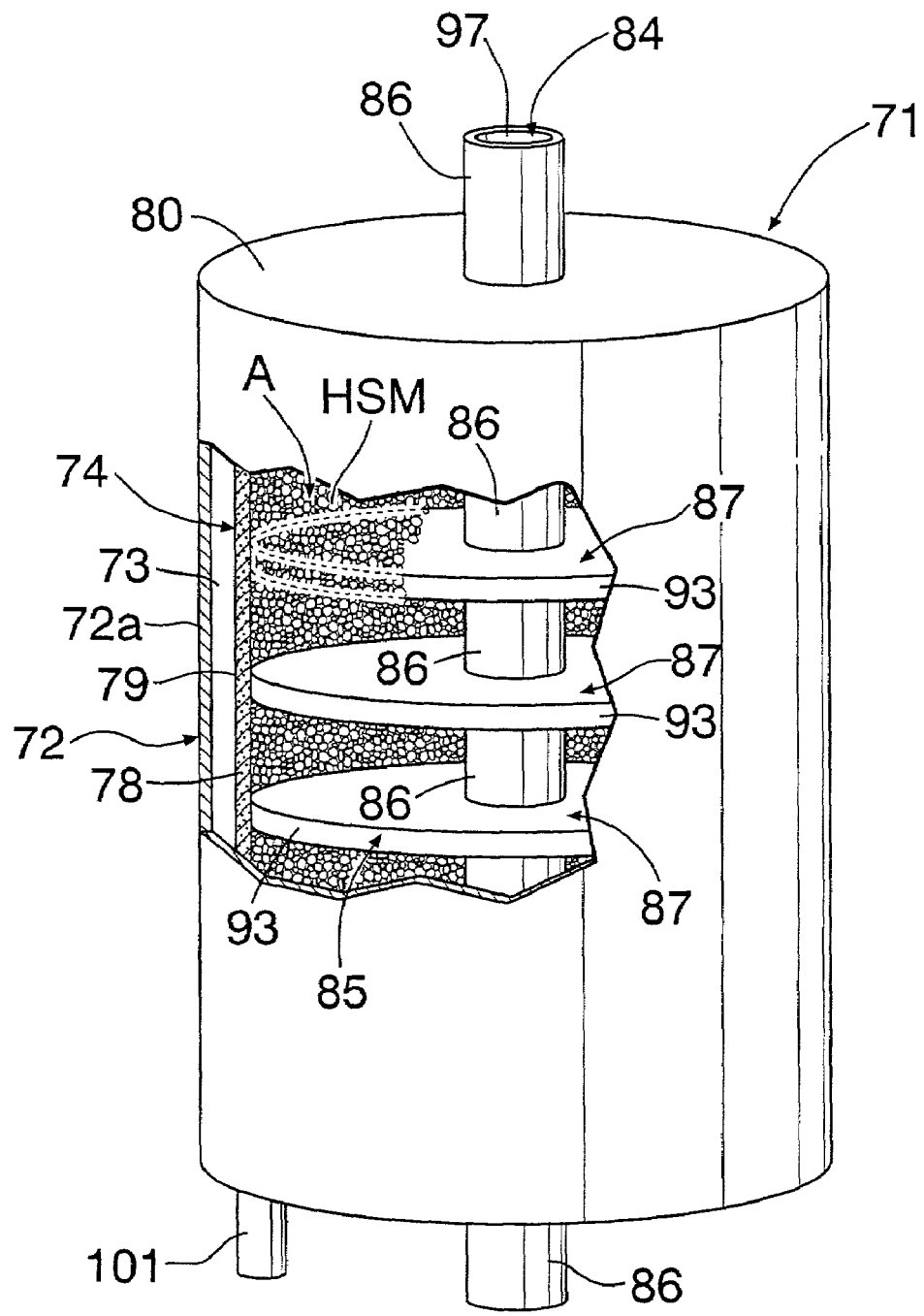
FIG. 11 is a perspective, partially exposed view of a hydrogen storage tank according to a fifth embodiment of the present invention.
Figure 12:
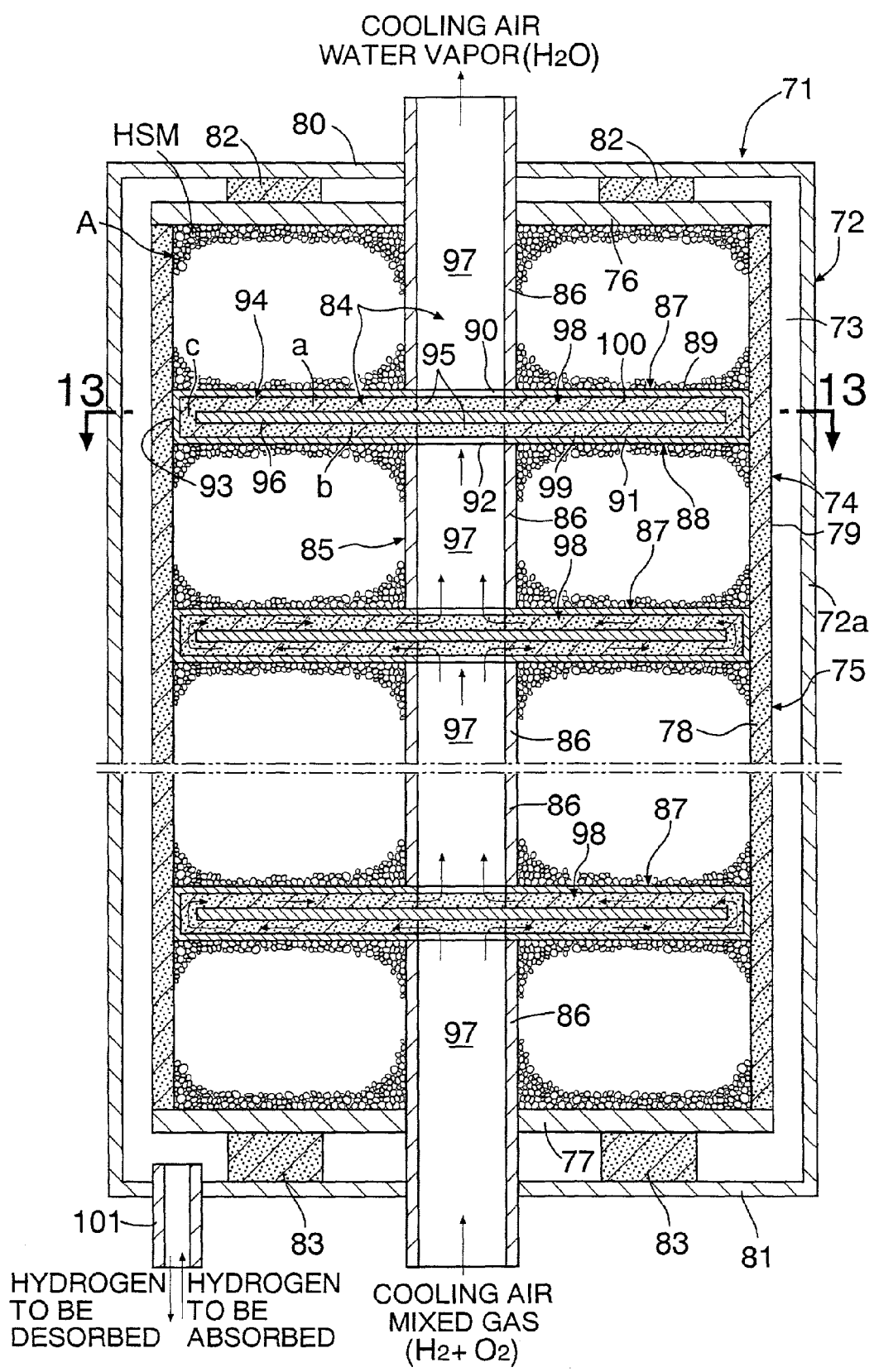
FIG. 12 is a vertical cross-sectional view of the hydrogen storage tank according to the fifth embodiment of the present invention.
Figure 13:
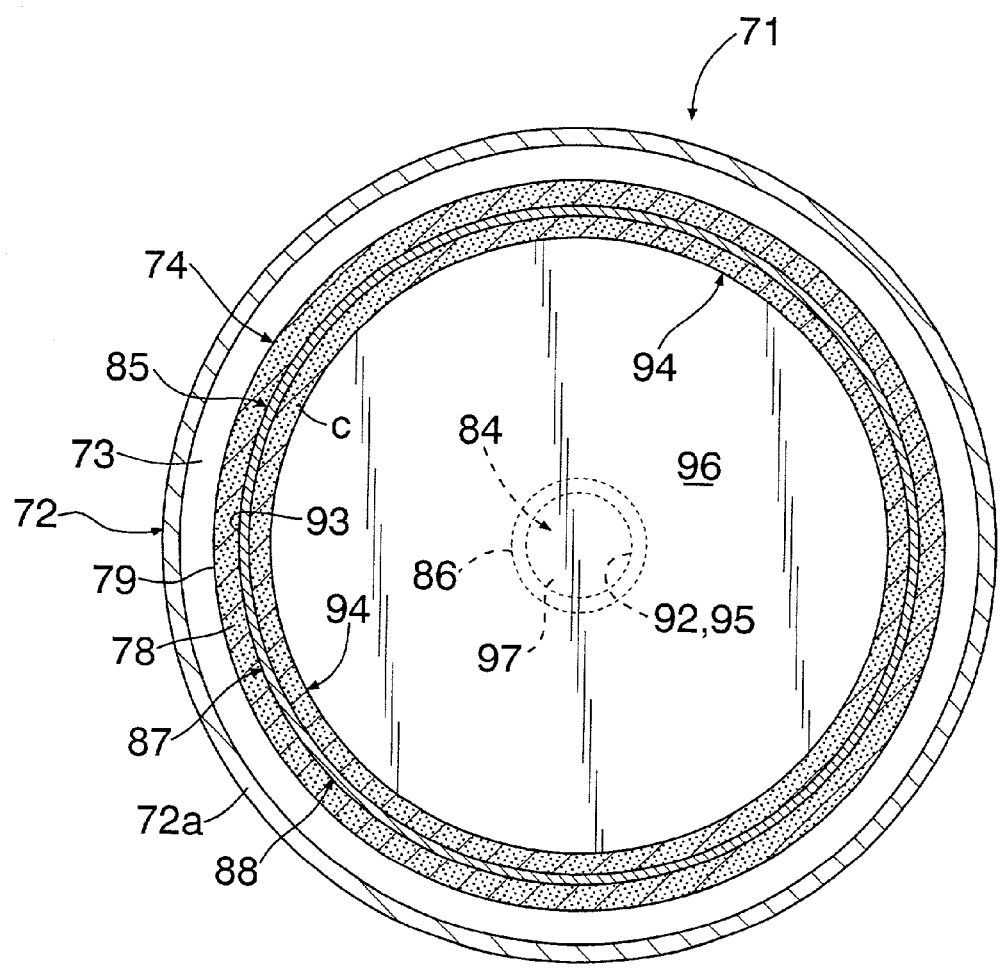
FIG. 13 is a cross-sectional view taken along section line 13—13 in FIG. 12.

In a fifth embodiment shown in FIGS. 11 to 13, the hydrogen storage tank 71 comprises a pressure-resist outer cylinder 72 made of stainless steel and has a circular cross section. A cylindrical hydrogen storage section 74 is accommodated in the outer cylinder 72 in such a manner as to be distanced from an inner peripheral surface of an outer peripheral wall 72a of the outer cylinder 72 to provide a hydrogen passage 73 therein. A stainless steel cylindrical housing 75 of the cylindrical hydrogen storage section 74 includes top and bottom walls 76 and 77. A porous filter 78 is joined by welding between opposite outer peripheries of the top and bottom walls 76 and 77 to form an outer peripheral wall. The filter 78 has a number of pores, for example pores being 0.1 to 10 μm in diameter, through which hydrogen passes so that it has a hydrogen absorption and desorption surface 79 on at least a part of its outer peripheral surface (a whole outer peripheral surface in this embodiment). Interposed between the top and bottom walls 76 and 77 of the housing 75 and a top and bottom walls 80 and 81 of the outer cylinder 72 are a plurality of insulation members 82 and 83 of porous ceramics such as firebrick and pumice, glass fiber cloth, and glass fiber board.

The cylindrical housing 75 is filled with powdery hydrogen absorption material HSM to become an aggregate A, which includes therein a fluid passage 84 for passing the heating fluid and cooling fluid therethrough. Used as hydrogen absorption material HSM are hydrogen storage alloys (for example, a Mg alloy such as $Mg_2Ni$) or carbon with nanostructure.

A fluid passage 84 is defined by a passage forming section 85, which is configured as mentioned below. A plurality of stainless steel tubular members 86 having an axis identical to that of the cylindrical hydrogen storage section 74, thus the cylindrical housing 75 are arranged in a line, and a disk member 87 is provided between adjacent tubular members 86. Each disk member 87 has a stainless steel shell 88 wherein the bottom of the upper tubular member 86 is joined by welding or the like to a periphery of a central hole 90 in an annular top wall 89 of the shell 88. The top of the lower tubular member 86 is joined by welding to a periphery of a center hole 90 in an annular bottom wall 91 of the shell 88. An outer peripheral wall 93 of the shell 88 is closely contacted with an inner peripheral surface of the filter 78.

The shell 88 covers a porous annular material 94, and a hole 95 in the center of the porous annular material 94 aligns with the holes 90 and 92 of the top and bottom walls 89 and 91, respectively. The porous annular material 94 is divided into an annular upper area a and an annular lower area b by a circular partition board 96 embedded at its axially intermediate portion. The annular upper area a and the annular lower area b are mutually communicated via an annular intermediate area c between an outer peripheral surface of the circular partition board 96 and an inner peripheral surface of the outer peripheral wall 93 of the shell 88.

The uppermost and the lowest tubular members 86 penetrate top walls 76 and 80, and bottom walls 77 and 81 of the housing 75 and the outer cylinder 72, respectively.

The fluid passage 84 comprises a plurality of straight passages 97 formed by a plurality of tubular members 86 arranged along the axis of the cylindrical housing 75, and a diverging/converging passages 98 formed by the disk members 87 between the adjacent tubular members 86, in particular adjacent straight passages 97.

When the heating fluid is supplied from the lowest tubular member 86, a dispersion portion 99 of the diverging/converging passage 98 is positioned in the lower area b of the porous annular material 94 and functions to diverge the fluid having passed from the lower straight passage 97 through the central holes 92 and 95 toward an entire outer periphery of the cylindrical hydrogen storage section 74. Also, an accumulation portion 100 of the diverging/converging passage 98 is positioned in the upper area a of the porous annular material 94 and functions to converge the fluid having passed through the annular intermediate area c toward the central hole 95, in particular the upper straight passage 97. Adjacent diverging/converging passages 98 are arranged so as to generate heat accumulation therebetween. Therefore, the hydrogen absorption material HSM between the adjacent diverging/converging passages 98 can be efficiently heated. The porous annular material 94 is made of metallic porous materials (for example, Ni), ceramic porous materials, and the like having continuous pores, and the partition board 96 is made of stainless steel.

The heating fluid is a mixed gas of hydrogen and oxygen, and the diverging/converging passage 98, with the porous annular material 94, carries platinum, palladium and the like as a catalyst for facilitating the burning reaction of the mixed gas. Cooling gas, for example, air is used as the cooling fluid. A passing pipe 101 for hydrogen to be absorbed and hydrogen to be desorbed is held at the bottom wall 81 of the outer cylinder 72.

Next, hydrogen absorption and desorption in the hydrogen storage tank 71 will be described.

During hydrogen absorption, the hydrogen is introduced from a passing pipe 101 to the hydrogen passage 73. The hydrogen passes through the filter 78 around the entire periphery of the hydrogen storage unit 74 to be absorbed by a hydrogen absorption material aggregate A.

Cooling air is then supplied from the lowest tubular member 86 to pass through the straight passage 97, diverging/converging passage 98, central hole 90, diverging/converging passage 98 . . . in this order.

In this case, the hydrogen absorption and desorption surface 79 is along the entire outer peripheral surface of the cylindrical filter 78 and surrounded by the hydrogen passage 73, which permits enlarging the area for hydrogen absorption and desorption per unit volume, thereby increasing the amount of hydrogen absorption per unit volume, and improves a rate of hydrogen absorption.

In the hydrogen absorption material aggregate A, there is the fluid passage 84 in which cooling air passes through a plurality of straight passages 97 and a plurality of diverging/converging passages 98 having a large area for heat transfer. During hydrogen absorption, due to the process of hydrogen absorption from the outer periphery side, specifically, inwardly from the hydrogen absorption and desorption surface 79 side, heat-generated accompanying hydrogen absorption is smoothly transferred to the cooling air through the hydrogen absorption material HSM, thereby preventing thermal storage in the hydrogen absorption material aggregate A, improving hydrogen absorption efficiency and increasing amounts of hydrogen absorption.

During hydrogen desorption, the mixed gas of hydrogen and oxygen is supplied from the lowest tubular member 86 to pass through the straight passage 97, diverging/converging passage 98, straight passage 97, diverging/converging passage 98 . . . in this order. In the diverging/converging passage 98, the burning reaction of the mixed gas occurs in the presence of the platinum catalyst or the like. Burning heat and heated water vapor is generated, which further passes through the fluid passage 84 together with unreacted mixed gas.

Burning heat is transferred from the diverging/converging passage 98 having a large area for heat transfer to the hydrogen absorption material aggregate A. Heat from the heated water vapor is transferred from each straight passage 97 to the hydrogen absorption material aggregate A. Thus, the hydrogen absorption material HSM is efficiently heated , in part, from the generation of the heat accumulation mentioned above, which permits a rapid hydrogen desorption from the wide hydrogen absorption and desorption surface 79.

As described above, the hydrogen passage 73 is provided between the inner peripheral surface of the outer cylinder 72 and the outer peripheral surface of the hydrogen storage section 74 to keep them apart so that the insulation efficiency can be increased between the outer cylinder 72 and the cylindrical hydrogen storage section 74 during hydrogen absorption and desorption.

Figure 14:
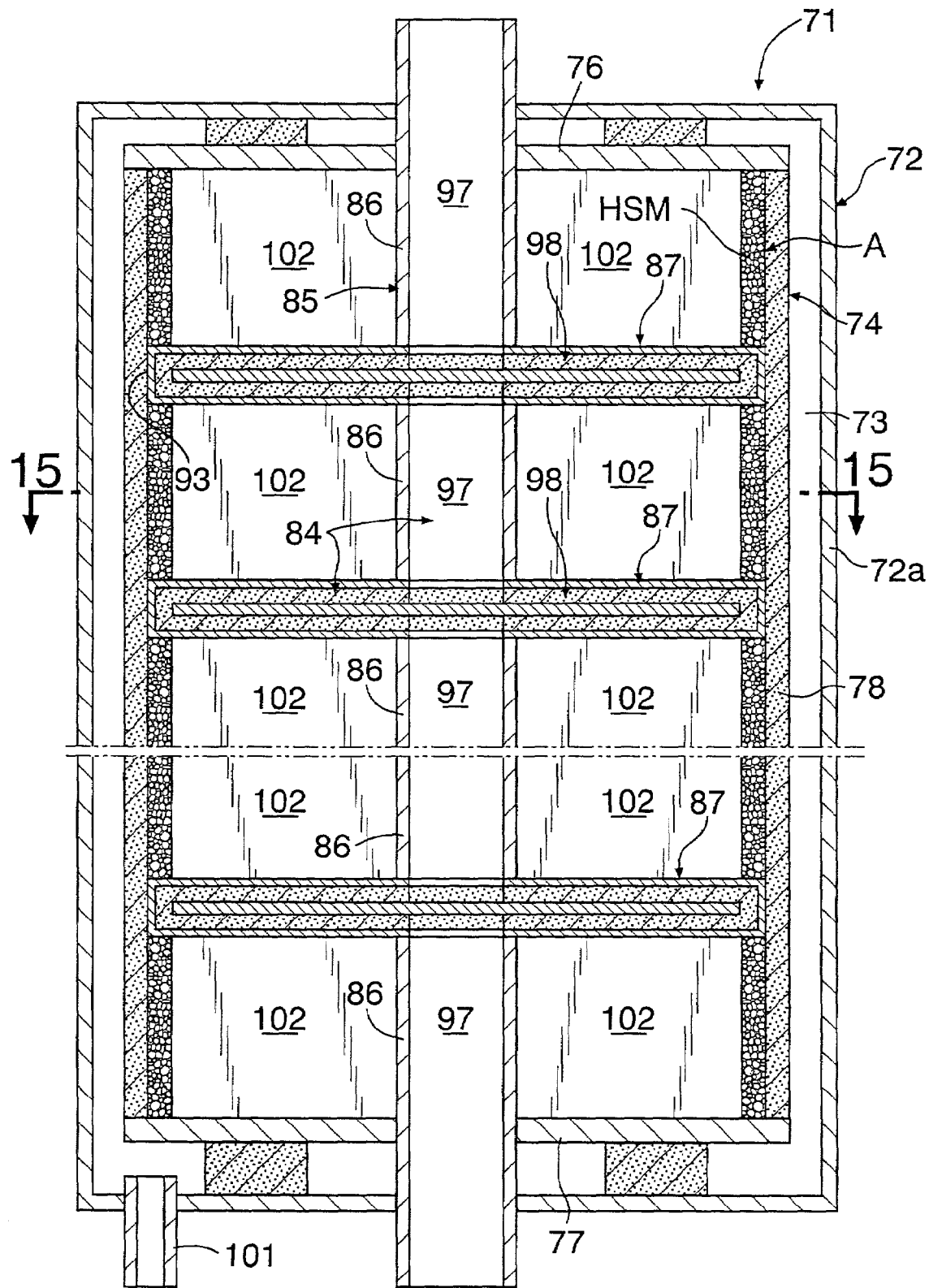
FIG. 14 is a vertical cross-sectional view of a hydrogen storage tank according to a sixth embodiment of the present invention.
Figure 15:
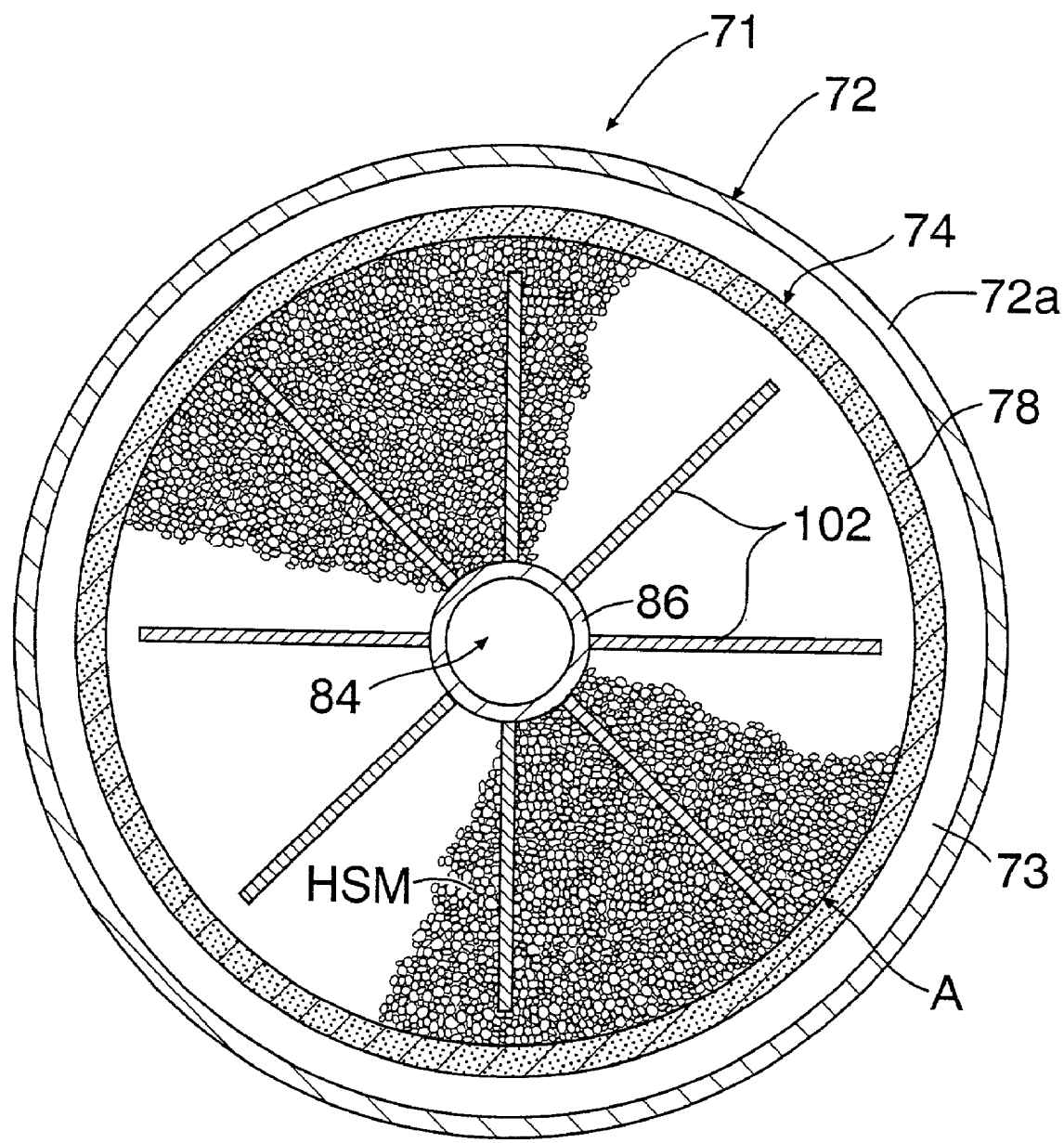
FIG. 15 is a cross-sectional view taken along section line 15—15 in FIG. 14.

FIGS. 14 and 15 show a hydrogen storage tank 71 according to a sixth embodiment of the present invention. In this embodiment, in the hydrogen storage section 74, a plurality of fins 102 made of excellent thermally conductive materials, such as copper and Ni, are arranged so as to radially extend from each tubular member 86. The uppermost fins 102 are joined to the tubular member 86, top wall 76, and disk member 87 by welding. The lowest fins 102 are joined to the tubular member 86, bottom wall 77 and disk member 87 by welding. The respective intermediate fins 102 are joined to the tubular member 86 and the upper and lower disk members 87 by welding. Each fin 102 contacts the tubular member 86 and disk member 87, which contributes to heating and cooling.

The fins 102 embedded in the hydrogen absorption and desorption aggregate A contribute to cooling and heating of the hydrogen absorption material HSM. Additionally, they strengthen the passage forming section 85, and prevent uneven distribution of the powdery hydrogen absorption material HSM.

Figure 16:
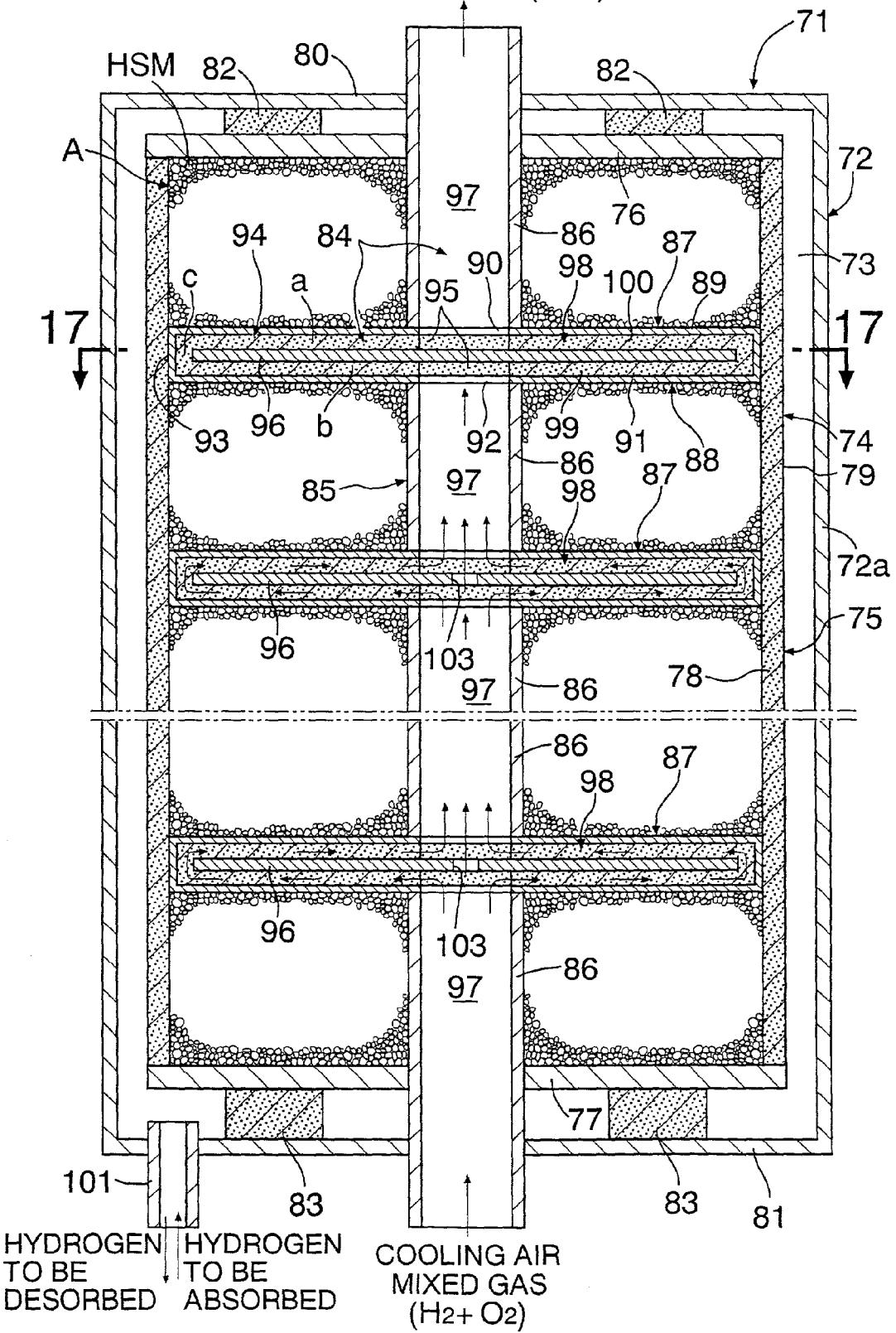
FIG. 16 is a vertical sectional view corresponding to FIG. 12 of a hydrogen storage tank according to a seventh embodiment of the present invention.
Figure 17:
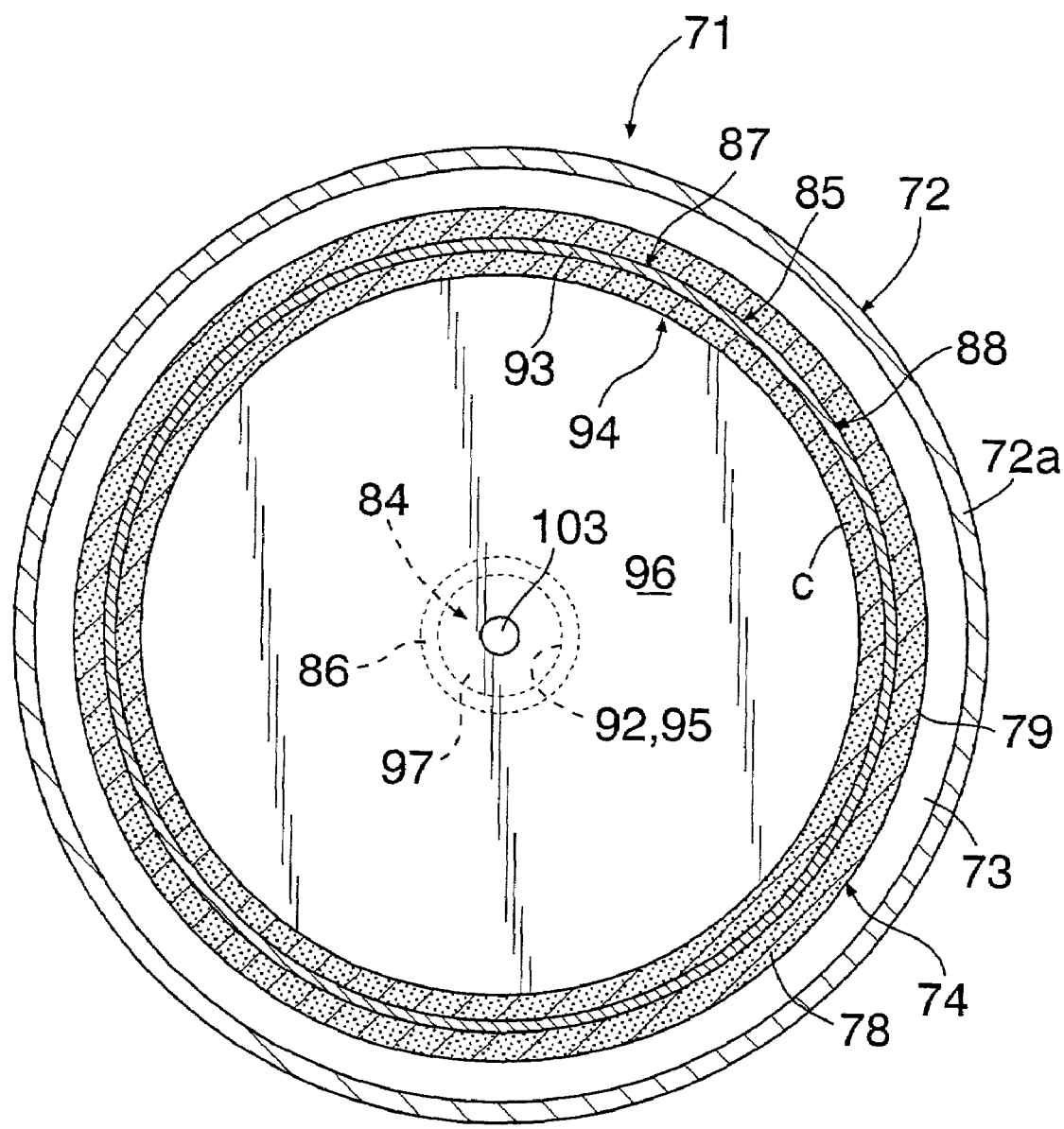
FIG. 17 is a cross-sectional view taken along section line 17—17 in FIG. 16.

FIGS. 16 and 17 show a hydrogen storage tank 71 according to a seventh embodiment of the present invention. In this embodiment, all or some selected of the partition board 96, except the uppermost partition board 96, are formed at the center with a through hole 103. The through holes 103 are used for directly introducing a part of the unreacted mixed gas to the next straight passage 97 without passing through the diverging/converging passage 98.

Figure 18:
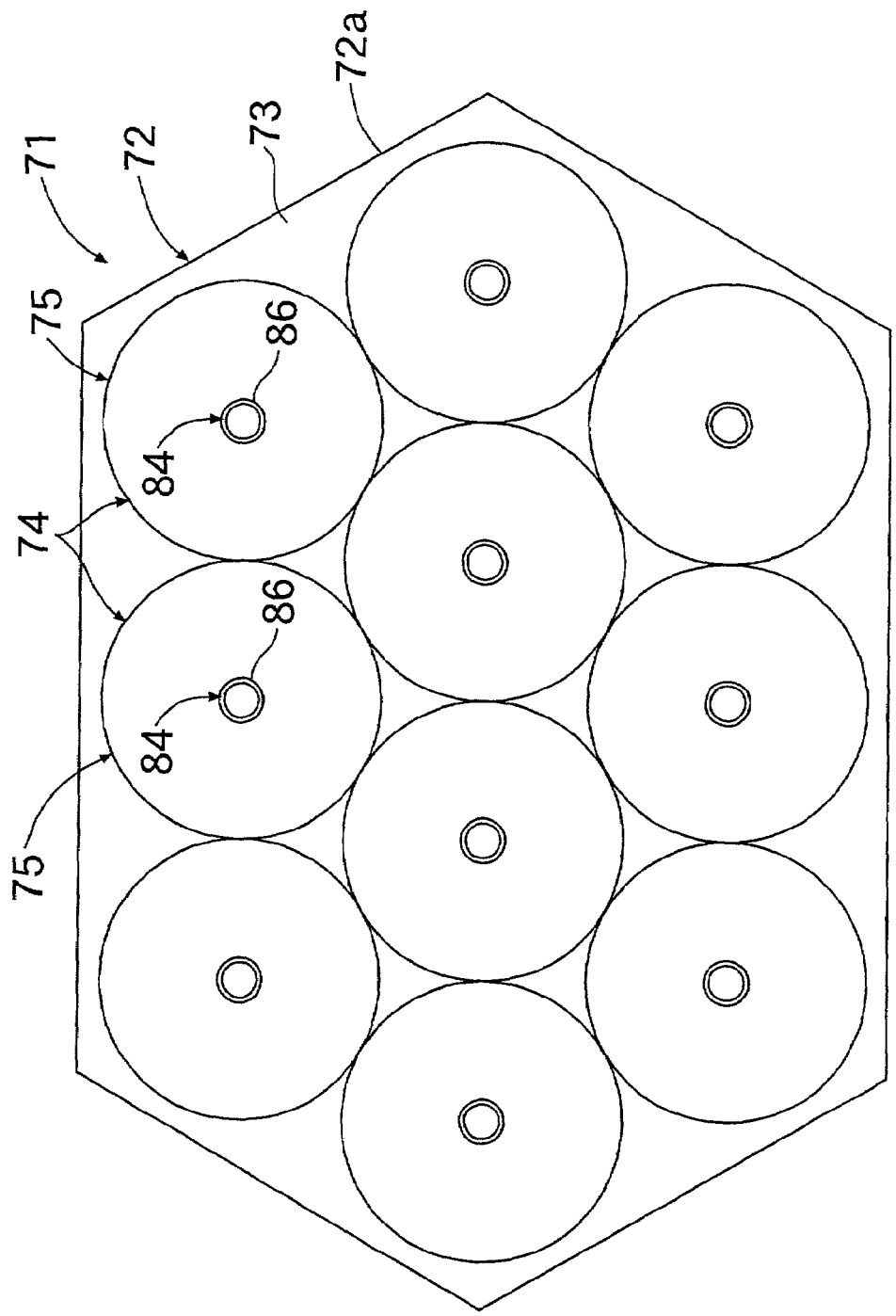
FIG. 18 is a schematic diagram of a hydrogen storage tank according to an eighth embodiment of the present invention.

FIG. 18 shows a hydrogen storage tank 71 according to an eighth embodiment of the present invention. In this embodiment, a plurality of hydrogen storage sections 74 are arranged in the pressure-resist outer cylinder 72 to have maximum density in order to increase amounts of hydrogen absorption.

Figure 19:
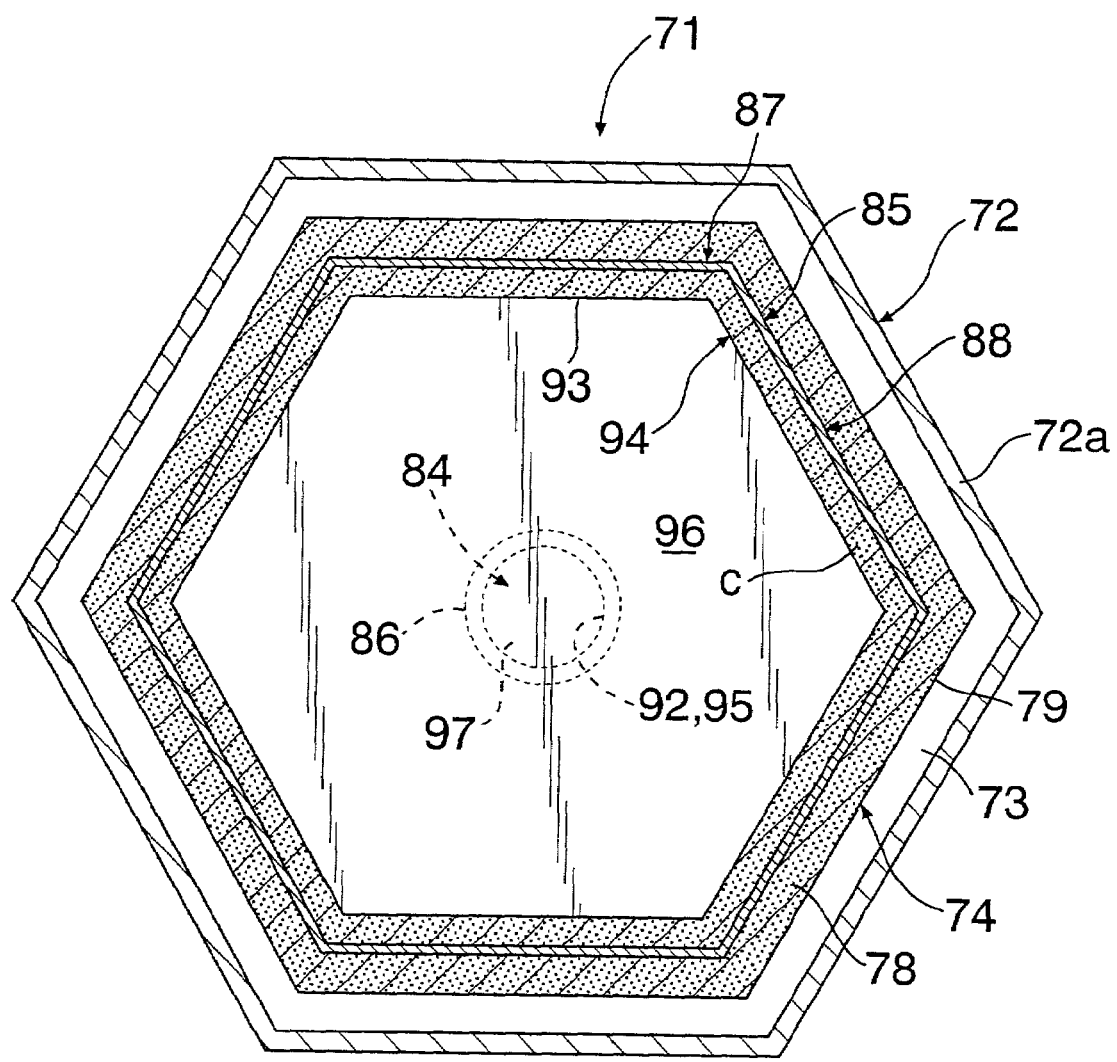
FIG. 19 is a cross-sectional view of a hydrogen storage tank according to a ninth embodiment of the present invention.

FIG. 19 shows a hydrogen storage tank 71 according to a ninth embodiment of the present invention. In this embodiment, the outer cylinder 72 and the hydrogen storage section 74 are formed to have hexagonal cross sections. In this manner, the cross sections of the outer cylinder 72 and the hydrogen storage section 74 can be shaped with no special restraint.

Figure 20:
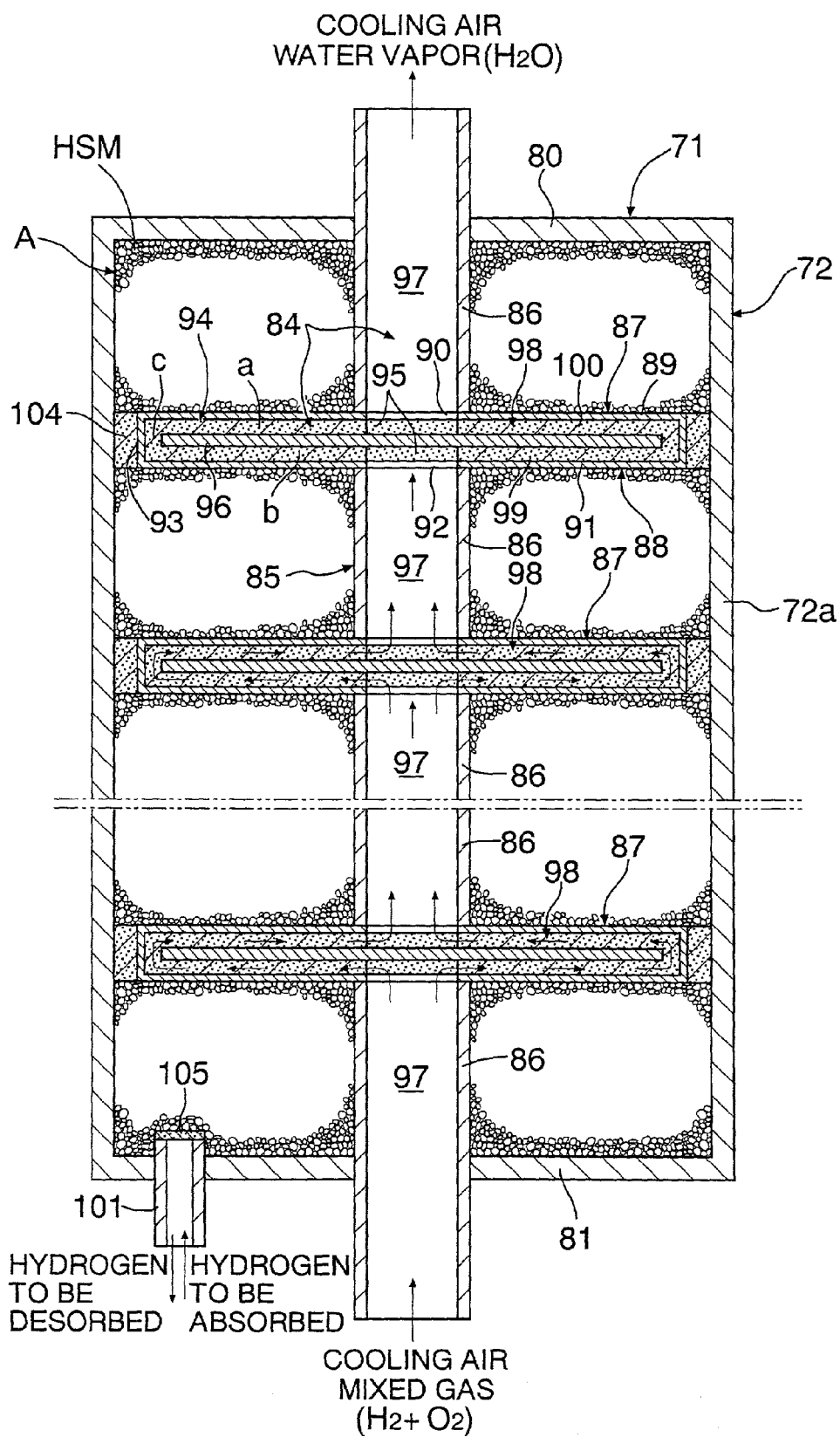
FIG. 20 is a vertical cross-sectional view of a hydrogen storage tank according to a tenth embodiment of the present invention.

FIG. 20 shows a hydrogen storage tank 71 according to a tenth embodiment of the present invention. In this embodiment, hydrogen is absorbed directly from a flow pipe 101 held at the bottom wall 81 of the outer cylinder 72 to the hydrogen absorption and desorption aggregate A, and desorbed from the hydrogen absorption and desorption aggregate A directly through the flow pipe 101. In this case, the hydrogen storage tank 71 has the outer cylinder 72, the hydrogen absorption and desorption aggregate A in the outer cylinder 72, and a fluid passage 84 provided in the aggregate A for passing the heating fluid, for example, the above mentioned mixed gas, and the cooling fluid, for example, air, there through. The fluid passage 84 comprises a plurality of the straight passages 97 along the axis of the outer cylinder 72, and a plurality of diverging/converging passages 98 situated between adjacent straight passages 97 where the fluid from one straight passage 97 is diverged toward the whole periphery of the outer cylinder 72 to then converge the fluid toward the other straight passage 97. In this case, the outer peripheral wall 93 of the shell 88 is spaced apart from the outer peripheral wall 72a of the outer cylinder 72, and an annular filter 104, which defines a passage of hydrogen to be absorbed and hydrogen to be desorbed, is fitted therebetween. On an inner opening end of the flow pipe 101, a porous filter 105 is mounted. Both filters 104 and 105 are made of stainless steel, ceramics and the like, and have porous structure similar to that of the filter 78. Other configurations in the tenth embodiment are the same as those in the fifth embodiment, and accordingly, in FIG. 20, the same component parts as in FIG. 12 are referred to by the same reference numerals, and their descriptions will be omitted.

In the fifth to tenth embodiments, it is also possible to use hydrogen for burning without being mixed with oxygen (air in the embodiments) as heating fluid.

What is claimed is:

1. A hydrogen storage tank comprising:
   an outer cylinder; and
   at least one cylindrical hydrogen storage module positioned within the outer cylinder, the at least one cylindrical hydrogen storage module having an outer diameter smaller than an inner diameter of the outer cylinder wherein a hydrogen passage is formed between an inner peripheral surface of the outer cylinder and the at least one cylindrical hydrogen storage module,
   each cylindrical hydrogen storage module comprising:
      a laminate including a plurality of adjacent hydrogen storage units filled with hydrogen absorption materials, the laminate having a hydrogen absorption and desorption surface on at least a part of an outer peripheral surface of the laminate,
      at least one heating/cooling elements positioned between adjacent ones of the hydrogen storage units;
      at least one main passage that passes through the laminate in a lamination direction of the hydrogen storage units parallel to a longitudinal axis of the outer cylinder, wherein heating fluid and cooling fluid pass through the at least one main passage; and sub passages that branch from the at least one main passage in a direction perpendicular to the longitudinal axis and extend over within each of the heating/cooling elements, wherein the sub passages comprise a plurality of guide members that circulate the heating fluid and cooling fluid throughout the sub passages, wherein the heating fluid comprises hydrogen for burning and oxygen and each of the heating/cooling elements include a catalyst that facilitates a burning reaction of the hydrogen burned with the oxygen, wherein the at least one main passage comprises a first main passage that permits the hydrogen for burning to flow therethrough and a second main passage that permits the oxygen to flow therethrough, wherein the sub passages include a first sub passage situated on one of opposite sides of a porous carrier that holds the catalyst and communicates with the first main passage and a second sub passage situated on the other side of the porous carrier and communicates with the second main passage, wherein each cylindrical hydrogen storage module has a discharge passage that communicates with the second sub passage.

2. The hydrogen storage tank according to claim 1, wherein each hydrogen storage unit comprises a plurality of fins embedded within the hydrogen absorption material and contacting the heating/cooling elements.

3. The hydrogen storage tank according to claim 1, wherein the hydrogen absorption material is a powder.

4. A hydrogen storage tank comprising:
an outer cylinder; and
at least one cylindrical hydrogen storage module positioned within the outer cylinder, the at least one cylindrical hydrogen storage module having an outer diameter smaller than an inner diameter of the outer cylinder wherein a hydrogen passage is formed between an inner peripheral surface of the outer cylinder and the at least one cylindrical hydrogen storage module,
each cylindrical hydrogen storage module comprising:
a laminate including a plurality of adjacent hydrogen storage units filled with hydrogen absorption materials, the laminate having a hydrogen absorption and desorption surface on at least a part of an outer peripheral surface of the laminate,
at least one heating/cooling elements positioned between adjacent ones of the hydrogen storage units;
at least one main passage that passes through the laminate in a lamination direction of the hydrogen storage units parallel to a longitudinal axis of the outer cylinder, wherein heating fluid and cooling fluid pass through the at least one main passage; and
sub passages that branch from the at least one main passage in a direction perpendicular to the longitudinal axis and extend over within each of the heating/cooling elements, wherein the sub passages comprise a plurality of guide members that circulate the heating fluid and cooling fluid throughout the sub passages, wherein the heating fluid is a mixed gas of hydrogen and oxygen, and wherein the heating/cooling elements include a catalyst that facilitates a burning reaction of the mixed gas, wherein the at least one main passage includes first and second main passages that permit the mixed gas to flow therethrough, wherein the sub passages include a first sub passage situated on one of opposite sides of a carrier that holds the catalyst and communicates with the first and second main passages and a second sub passage situated on the other side of the carrier and communicates with the first and second main passages, wherein each cylindrical hydrogen storage module comprises a discharge passage that communicates with the first and second sub passages.

5. The hydrogen storage tank according to claim 4, wherein each hydrogen storage unit further comprises a plurality of fins embedded in the hydrogen absorption material to contact the heating/cooling elements.

6. The hydrogen storage tank according to claim 5, wherein the hydrogen absorption material is a powder.

* * * * *